US012488802B2

(12) United States Patent
Ashour et al.

(10) Patent No.: US 12,488,802 B2
(45) Date of Patent: Dec. 2, 2025

(54) METHOD AND APPARATUS FOR ERROR RECOVERY IN PREDICTIVE CODING IN MULTICHANNEL AUDIO FRAMES

(71) Applicant: Telefonaktiebolaget LM Ericsson (publ), Stockholm (SE)

(72) Inventors: Chamran Moradi Ashour, Stockholm (SE); Erik Norvell, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 673 days.

(21) Appl. No.: 17/599,974

(22) PCT Filed: Mar. 27, 2020

(86) PCT No.: PCT/EP2020/058639

§ 371 (c)(1),
(2) Date: Sep. 29, 2021

(87) PCT Pub. No.: WO2020/201040

PCT Pub. Date: Oct. 8, 2020

(65) Prior Publication Data

US 2022/0172732 A1 Jun. 2, 2022

Related U.S. Application Data

(60) Provisional application No. 62/826,084, filed on Mar. 29, 2019.

(51) Int. Cl.
*G10L 19/008* (2013.01)
*G10L 19/22* (2013.01)
(Continued)

(52) U.S. Cl.
CPC ............ *G10L 19/008* (2013.01); *G10L 19/22* (2013.01); *G10L 19/26* (2013.01); *G10L 25/21* (2013.01); *G10L 25/78* (2013.01)

(58) Field of Classification Search
None
See application file for complete search history.

(56) References Cited

U.S. PATENT DOCUMENTS 7,835,916 B2 11/2010 Bruhn
8,359,196 B2 1/2013 Yoshida
(Continued)

FOREIGN PATENT DOCUMENTS

CN 104021792 A 9/2014
CN 107112022 A * 8/2017 ........... G10L 19/005
(Continued)

OTHER PUBLICATIONS

Ashwin Kashyap, Mikael K. Rudberg "A low complexity packet loss concealment algorithm for G.711 and G.722" Retrieved from http: //users.cecs.anu.edu.au/~ramtin/ICSPCS/ICSPCS'07/papers/21.pdf (Year: 2007).*

(Continued)

*Primary Examiner* — Richemond Dorvil
*Assistant Examiner* — Alexander G Marlow
(74) *Attorney, Agent, or Firm* — Sage Patent Group

(57) ABSTRACT

A method, apparatus and decoder for replacing decoded parameters in a received multichannel signal in which a frame of consecutive frames of the received multichannel signal is decoded and responsive to receiving a previous frame bad frame indicator while operating in a predictive decoding mode with a current frame of the consecutive frames, it is determined whether a parameter stability measure is below a threshold. Responsive to the parameter stability measure being below the threshold a parameter recovery is activated by retrieving the estimated parameters and replacing decoded parameters of the current frame with the estimated parameters. Otherwise, it is detected whether a source is an active source and responsive to the source (Continued)

being an active source, decoded parameters of the current frame are stored as estimated parameters and the parameter stability measure is determined.

26 Claims, 10 Drawing Sheets

(51) Int. Cl.

| | |
|---|---|
| ***G10L 19/26*** | (2013.01) |
| ***G10L 25/21*** | (2013.01) |
| ***G10L 25/78*** | (2013.01) |

(56) References Cited

U.S. PATENT DOCUMENTS

| | | | | |
|---|---|---|---|---|
| 9,390,729 | B2 * | 7/2016 | Wang | G10L 25/78 |
| 2004/0039464 | A1 | 2/2004 | Virolainen et al. | |
| 2005/0154584 | A1 * | 7/2005 | Jelinek | G10L 19/00 704/219 |
| 2007/0100614 | A1 | 5/2007 | Yoshida et al. | |
| 2010/0198590 | A1 * | 8/2010 | Tackin | H04L 12/6418 704/214 |
| 2010/0280822 | A1 | 11/2010 | Yoshida | |
| 2011/0125505 | A1 * | 5/2011 | Vaillancourt | G10L 19/005 704/500 |
| 2013/0339038 | A1 * | 12/2013 | Norvell | G10L 19/083 704/500 |
| 2014/0207445 | A1 | 7/2014 | Gao et al. | |
| 2016/0104487 | A1 | 4/2016 | Schnabel et al. | |
| 2016/0111100 | A1 | 4/2016 | Ramo et al. | |
| 2016/0148618 | A1 * | 5/2016 | Huang | G10L 19/0212 381/2 |
| 2016/0337776 | A1 | 11/2016 | Breebaart et al. | |
| 2017/0169833 | A1 | 6/2017 | Lecomte et al. | |
| 2017/0180905 | A1 | 6/2017 | Purnhagen et al. | |
| 2019/0005967 | A1 | 1/2019 | Lecomte et al. | |

FOREIGN PATENT DOCUMENTS

| | | | |
|---|---|---|---|
| CN | 108810281 | A | 11/2018 |
| CO | 10164064 | A2 | 11/2011 |
| JP | 2003140699 | A | 5/2003 |
| JP | 2011529579 | A | 12/2011 |
| JP | 2016528535 | A | 9/2016 |
| JP | 2018116283 | A | 7/2018 |

OTHER PUBLICATIONS

Korean Office Action and English Summary, Korean Patent Application No. 2021-7034060, mailed Jan. 15, 2024, 11 pages.

3GPP TS 26.290, V9.0.0 (Sep. 2009), 3rd Generation Partnership Project; "Technical Specification Group Service and System Aspects; Extended Adaptive Multi-Rate—Wideband (AMR-WB+) codec; Transcoding Functions (Release 9)", Sep. 2009, 85 pages.

ITU-T Telecommunication Standardization Sector of ITU, "Series G: Transmission Systems and Media, Digital Systems and Networks Digital terminal equipments—Coding of voice and audio signals" Jun. 2006, 257 pages.

International Search Report for International Application No. PCT/EP2020/058639 dated May 6, 2020, 5 pages.

Wabnik et al.; "Packet Loss Concealment in Predictive Audio Coding", 2005 IEEE Workshop on Applications of Signal Processing to Audio and Acoustics, Oct. 16-19, 2005, New Paltz, NY, XP10854341, pp. 227-230.

3GPP TS 26.447, V16.0.0 (Mar. 2019), 3rd Generation Partnership Project; Technical Specification Group Services and System Aspects; Codec for Enhanced Voice Services (EVS); Error Concealment of Lost Packets (Release 16), XP051698104, 82 pages.

Faller et al.; "Parametric Multichannel Audio Coding: Synthesis of Coherence Cues", IEEE Transactions on Audio, Speech, and Language Processing, vol. 14, No. 1, Jan. 2006, pp. 299-310.

Breebart et al.; "MPEG spatial audio coding / MPEG surround: Overview and current status", OAI, Oct. 2005, 18 pages.

Japanese Office Action and English Translation, Japanese Patent Application No. 2024-002291, mailed Apr. 15, 2025, 8 pages.

International Telecommunication Union, Series G: Transmission Systems and Media, Digital Systems and Networks, "Low-complexity, full-band audio coding for high-quality, conversational applications", Recommendation ITU-T G.719, Jun. 2008, 85 pages.

Universal Mobile Telecommunications System (UMTS); LTE; EVS Codec Error Concealment of Lost Packets, 3GPP TS 26.447 version 12.0.0 Release 12, Oct. 2014, 82 pages.

3rd Generation Partnership Project; Technical Specification Group Service and System Aspects; Audio codec processing functions, Extended Adaptive Multi-Rate—Wideband (AMRWB+) codec. 3GPP TS 26.290 version 9.0.0 Release 9, Sep. 2009, 85 pages.

European Office Action, European Application No. 20715049.1, mailed Oct. 11, 2024, 7 pages.

Notice of Allowance (with English Translation) mailed Mar. 25, 2024 for Korean Patent Application No. 2021-703589, 9 pages.

Columbian Office Action, File Ref. No. NC2021/0013506, International Patent Application No. PCT/EP2020/058638, mailed Mar. 22, 2024, 8 pages.

Office Action and Search Report mailed Jan. 16, 2024, for Chinese Application No. 2020800260500, 7 pages.

Japanese Office Action, Japanese Patent Application No. 2021-557779, mailed Jan. 17, 2023, 6 pages.

First Examination Report for Indian Patent Application No. 202147048782, mailed May 25, 2022, 8 pages.

Korean Notice of Allowance and English Translation, Korean Patent Application No. 2021-7034060, mailed Sep. 24, 2024, 9 pages.

Colombian Office Action, Colombian Patent Application No. NC2021/0013506, mailed Apr. 7, 2025, 9 pages.

* cited by examiner

METHOD AND APPARATUS FOR ERROR RECOVERY IN PREDICTIVE CODING IN MULTICHANNEL AUDIO FRAMES

CROSS REFERENCE TO RELATED APPLICATIONS

This application is a 35 U.S.C. § 371 national stage application of PCT International Application No. PCT/EP2020/058639 filed on Mar. 27, 2020, which in turn claims domestic priority to U.S. Provisional Patent Application No. 62/826,084, filed on Mar. 29, 2019, the disclosures and content of which are incorporated by reference herein in their entirety.

TECHNICAL FIELD

The application relates to methods and apparatuses for error recovery in predictive coding for stereo or multichannel audio encoding and decoding.

BACKGROUND

Although the capacity in telecommunication networks is continuously increasing, it is still of great interest to limit the required bandwidth per communication channel. In mobile networks smaller transmission bandwidths for each call yields lower power consumption in both the mobile device and the base station. This translates to energy and cost saving for the mobile operator, while the end user will experience prolonged battery life and increased talk-time. Further, with less consumed bandwidth per user, the mobile network can service a larger number of users in parallel.

Through modern music playback systems and movie theaters most listeners are accustomed to high quality immersive audio. In mobile telecommunication services, the constraints on radio resources and processing delay have kept the quality at a lower level and most voice services still deliver only monaural sound. Recently, stereo and multichannel sound for communication services has gained momentum in the context of Virtual/Mixed/Augmented Reality which requires immersive sound reproduction beyond mono. To render high quality spatial sound within the bandwidth constraints of a telecommunication network still presents a challenge. In addition, the sound reproduction also needs to cope with varying channel conditions where occasional data packets may be lost due to e.g. network congestion or poor cell coverage.

In a typical stereo recording the channel pair shows a high degree of similarity, or correlation. Some embodiments of stereo coding schemes may exploit this correlation by employing parametric coding, where a single channel is encoded with high quality and complemented with a parametric description that allows reconstruction of the full stereo image, such as the scheme discussed in C. Faller, "Parametric multichannel audio coding: synthesis of coherence cues," in IEEE Transactions on Audio, Speech, and Language Processing, vol. 14, no. 1, pp. 299-310, January 2006. The process of reducing the channel pair into a single channel is often called a down-mix and the resulting channel is often called the down-mix channel. The down-mix procedure typically tries to maintain the energy by aligning inter-channel time differences (ITD) and inter-channel phase differences (IPD) before mixing the channels. To maintain the energy balance of the input signal, the inter-channel level difference (ILD) may also be measured. The ITD, IPD and ILD are then encoded and may be used in a reversed up-mix procedure when reconstructing the stereo channel pair at a decoder. The ITD, IPD, and ILD parameters describe the correlated components of the channel pair, while a stereo channel pair may also include a non-correlated component which cannot be reconstructed from the down-mix. This non-correlated component may be represented with an inter-channel coherence parameter (ICC). The non-correlated component may be synthesized at a stereo decoder by running the decoded down-mix channel through a decorrelator filter, which outputs a signal which has low correlation with the decoded down-mix. The strength of the decorrelated component may be controlled with the ICC parameter.

Similar principles apply for multichannel audio such as 5.1 and 7.1.4, and spatial audio representations such as Ambisonics or Spatial Audio Object Coding. The number of channels can be reduced by exploiting the correlation between the channels and bundling the reduced channel set with metadata or parameters for channel reconstruction or spatial audio rendering at the decoder.

To overcome the problem of transmission errors and lost packets, telecommunication services make use of Packet Loss Concealment (PLC) techniques. In the case that data packets are lost or corrupted due to poor connection, network congestion, etc., the missing information of lost or corrupt data packets in the receiver side may be substituted by the decoder with a synthetic signal to conceal the lost or corrupt data packet. Some embodiments of PLC techniques are often tied closely to the decoder, where the internal states can be used to produce a signal continuation or extrapolation to cover the packet loss. For a multi-mode codec having several operating modes for different signal types, there are often several PLC technologies that can be implemented to handle the concealment of the lost or corrupted data packet.

Missing or corrupted packets may be identified by the transport layer handling the connection and is signaled to the decoder as a "bad frame" through a Bad Frame Indicator (BFI), which may be in the form of a flag. The decoder may store this flag in its internal state and also keep track of the history of bad frames, e.g. a "previous bad frame indicator" (PREV BFI). Note that one transmission packet may contain one or more speech or audio frames. This means that one lost or corrupted packet will label all the frames contained therein as "bad."

For stable audio scenes, the parameters may show a high degree of similarity between adjacent frames. To exploit this similarity, predictive coding schemes may be applied. In such a scheme a prediction of the current frame parameters is derived based on the past decoded parameters, and the difference to the true parameters is encoded. A simple but efficient prediction is to use the last decoded parameters as the prediction, in which case the predictive coding scheme can be referred to as a differential encoding scheme.

One issue with the predictive coding schemes is that the schemes are sensitive to errors. For example, if one or more elements of the predicted sequence are lost, the decoder will have a prediction error that may last a long time after the error has occurred. This problem is called error propagation and may be present in all predictive coding schemes. An illustration of error propagation is provided in FIG. 1. In FIG. 1, an absolute coding frame is lost before a sequence of consecutive predictive coding frames (i.e., a predictive coding streak). The memory, which would have been updated with parameters from the lost frame, will have previous parameters stored and thus be corrupted. Since the memory is corrupted by the frame loss, the error will last during the entire predictive coding streak and only terminate when a new absolute coding frame is received.

One remedy is to force non-predictive coding at regular time intervals, which will terminate the error propagation. Another solution is to use a partial redundancy scheme, where a low-resolution encoding of the parameters is transmitted together with an adjacent audio frame. In case the decoder detects a frame loss in a predictive coding streak, the low-resolution parameters can be used to reduce the error propagation.

SUMMARY

One drawback of these predictive coding remedies is that they consume bandwidth, which is wasted bandwidth when the transmission channel is error-free.

According to some embodiments, a method is provided to replace decoded parameters in a received multichannel signal in a decoder. The method comprises decoding a frame of consecutive frames of the received multichannel signal. The method comprises responsive to receiving a previous frame bad frame indicator while operating in a predictive decoding mode with a current frame of the consecutive frames: determining whether a parameter stability measure is below a threshold and activating a parameter recovery by retrieving estimated parameters and replacing decoded parameters of a current frame with the estimated parameters responsive to the parameter stability measure being below the threshold. Otherwise, detecting whether a source is an active source. Responsive to determining the source is an active source, the method comprises storing decoded parameters of the current frame as estimated parameters and determining the parameter stability measure.

A potential advantage of using the estimated parameters based on the last observed active source in place of decoded parameters, is that the operations reduce bandwidth by not transmitting redundant parameter information that is wasted in error-free channel operation. Moreover, using the estimated parameters only during stable audio scenes avoids the audio scene from becoming "frozen" during unstable audio scenes.

According to some other embodiments an apparatus is provided. The apparatus is configured to replace decoded parameters with estimated parameters in a received multichannel signal. The apparatus comprises at least one processor and a memory communicatively coupled to the processor, the memory comprising instructions executable by the processor, which cause the processor to perform operations comprising decoding a frame of consecutive frames of the received multichannel signal. Responsive to receiving a previous frame bad frame indicator while operating in a predictive decoding mode with a current frame of the consecutive frames: determining whether a parameter stability measure is below a threshold and activating a parameter recovery by retrieving estimated parameters and replacing decoded parameters of a current frame with the estimated parameters responsive to the parameter stability measure being below the threshold. Otherwise, detecting whether a source is an active source. Responsive to determining the source is an active source, the method comprises storing decoded parameters of the current frame as estimated parameters and determining the parameter stability measure.

According to some other embodiments, a method is provided to replace decoded parameters with estimated parameters in a received multichannel signal in a decoder comprising a processor. The decoder may operate in an absolute decoding mode and a predictive decoding mode, depending on how an encoder encoded a current frame being decoded.

The method comprises receiving a current frame of the received multichannel signal and decoding parameters of the current frame. The method comprises determining whether the decoder should operate in the absolute decoding mode or the predictive decoding mode.

Responsive to determining the decoder should operate in a predictive decoding mode, the method may include responsive to receiving a previous frame bad frame indicator, determining whether a parameter stability measure is below a threshold. Responsive to the parameter stability measure being below the threshold, the method may include setting the parameter recovery flag to a second value and retrieving the estimated parameters and replacing decoded parameters of the current frame with the estimated parameters.

The method may include detecting whether the source is an active source. Responsive to determining the source is an active source, the method may include storing decoded parameters of the current frame as the estimated parameter and determining the parameter stability measure.

The method may further include responsive to not receiving a previous frame bad frame indicator, responsive to the parameter recovery flag being set to the first value, detecting whether a source is an active source. Responsive to determining the source is an active source, the method may include storing decoded parameters as estimated parameters and deriving the parameter stability measure.

Responsive to the parameter recovery flag being set to the second value, the method may include retrieving the estimated parameters and replacing decoded parameters of the current frame with the estimated parameters.

Responsive to the decoder operating in the absolute decoding mode, the method may include setting the parameter recovery flag to a first value. The method may include detecting whether a source is an active source. Responsive to determining the source is an active source, the method may include storing decoded parameters of the current frame as estimated parameters and determining a parameter stability measure.

According to some other embodiments, an apparatus is provided. The apparatus is configured to replace decoded parameters with estimated parameters in a received multichannel signal. The apparatus comprises at least one processor and a memory communicatively coupled to the processor, the memory comprising instructions executable by the processor, which cause the processor to perform operations comprising receiving a current frame of the received multichannel signal, decoding parameters of the current frame of the received multichannel signal and determining whether the decoder should operate in a predictive decoding mode or an absolute decoding mode.

Responsive to determining the decoder should operate in a predictive decoding mode, the apparatus is further configured to responsive to receiving a previous frame bad frame indicator, determine whether a parameter stability measure is below a threshold. Responsive to the parameter stability measure being below the threshold, setting the parameter recovery flag to a second value and retrieving the estimated parameters and replacing decoded parameters of the current frame with the estimated parameters.

The apparatus is further configured to detect whether the source is an active source. Responsive to determining the source is an active source, storing decoded parameters of the current frame as the estimated parameter and determining the parameter stability measure.

Responsive to not receiving a previous frame bad frame indicator, and responsive to the parameter recovery flag being set to the first value, the apparatus is configured to detect whether a source is an active source. Responsive to determining the source is an active source, storing decoded parameters as estimated parameters and deriving the parameter stability measure.

The apparatus is further configured to, responsive to the parameter recovery flag being set to the second value, retrieve the estimated parameters and replace decoded parameters of the current frame with the estimated parameters.

Responsive to determining the decoder should operate in an absolute decoding mode, the apparatus is further configured to set the parameter recovery flag to a first value and detect whether a source is an active source. Responsive to determining the source is an active source, storing decoded parameters of the current frame as estimated parameters and determining a parameter stability measure.

According to some other embodiments, a method is provided to replace decoded parameters with estimated parameters in a received multichannel signal in a decoder comprising a processor. The method may include receiving decoded parameters of a current frame of received multichannel signal. The method may include determining that a parameter recovery flag is set to a first value of the parameter recovery flag. The method may include determining whether a memory corrupt flag is set to a first value of the memory corrupt flag. The method may include responsive to the memory corrupt flag is set to the first value of the memory corrupt flag, determining whether the source is an active source. The method may include responsive to determining the source is an active source: storing decoded parameters as estimated parameters; and determining the parameter stability measure.

According to some other embodiments, an apparatus is provided. The apparatus is configured to replace decoded parameters with estimated parameters in a received multichannel signal. The apparatus comprises at least one processor and a memory communicatively coupled to the processor, the memory comprising instructions executable by the processor, which cause the processor to perform operations comprising receiving decoded parameters of a current frame of received multichannel signal and determining that a parameter recovery flag is set to a first value of the parameter recovery flag. The apparatus is further configured to determine whether a memory corrupt flag is set to a first value of the memory corrupt flag, and responsive to the memory corrupt flag being set to the first value of the memory corrupt flag, determining whether the source is an active source. Responsive to determining the source is an active source: storing decoded parameters as estimated parameters and determining the parameter stability measure.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

The inventive concepts described estimate a set of parameters based on the last observed active source in the encoder. If the decoder detects an error in a predictive coding streak, the estimated set of parameters may be used instead of the decoded parameters until the predictive coding streak is terminated by an absolute coding frame.

In cases where the audio scene is unstable and shows large variation in the stereo parameters, substituting the decoded parameters with the frozen estimated parameters may be annoying to the listener. To avoid this, a stability measure may be derived in the decoder which is used to decide if the estimated parameter set should be used.

To achieve these goals, the method in one embodiment includes an activity detector for detecting an active source (as opposed to background noise), a parameter estimator (or with a parameter memory) to store the parameters for the last observed active source, a parameter stability analyzer that determines whether parameters of consecutive frames change above a threshold, and a decision mechanism to activate the parameter recovery (replace decoded parameters with estimated parameters) based on at least the history of the bad frame indicator and in a further embodiment, the output of the stability analyzer.

Figure 2:
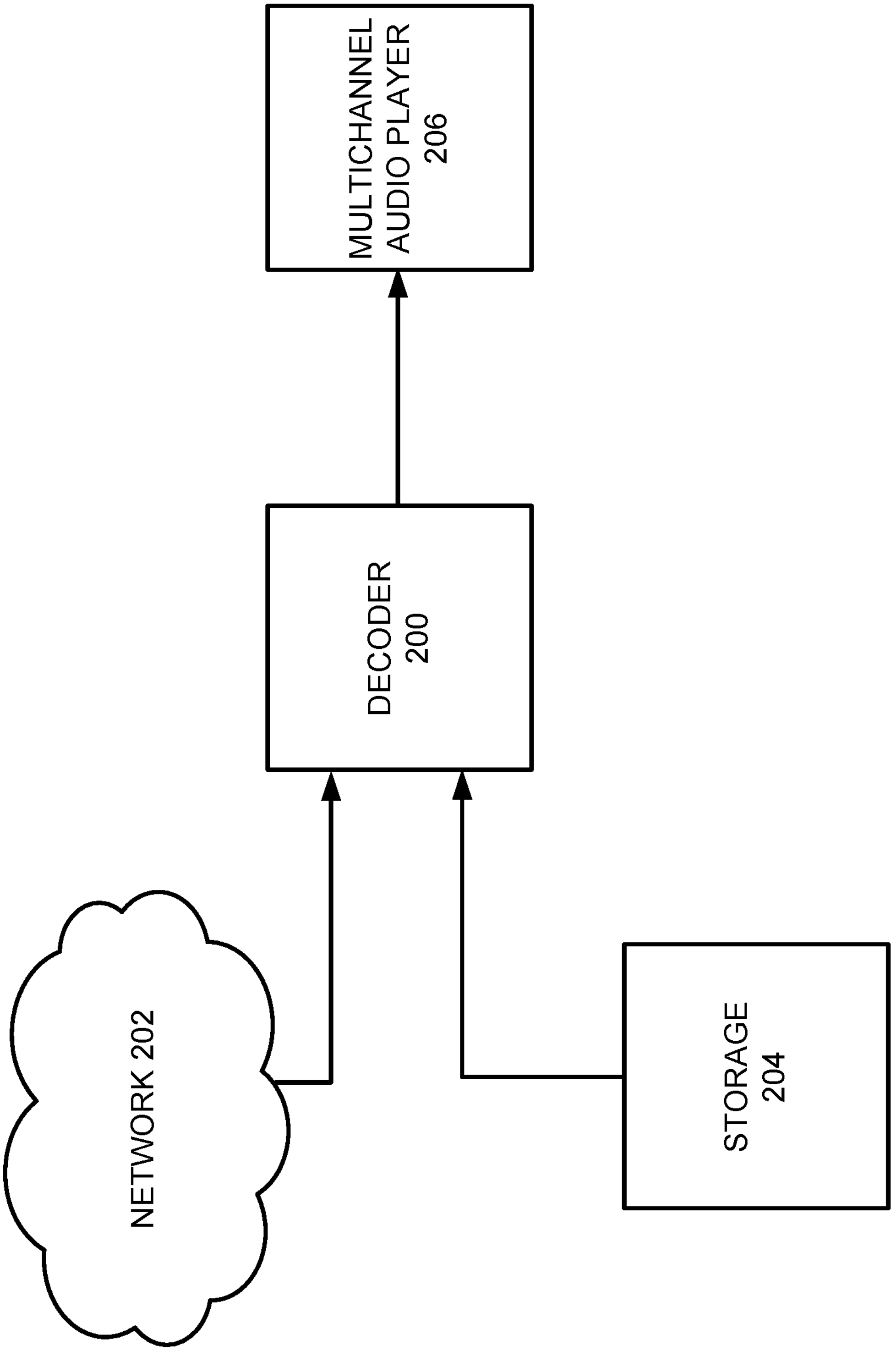
FIG. 2 is a block diagram illustrating an example of an environment of a decoder system in which error recovery in predictive coding may be performed according to some embodiments.

FIG. 2 illustrates an example of an operating environment of a decoder 200 that may be used to decode multichannel bitstreams as described herein. The decoder 200 may be part of a media player, a mobile device, a set-top device, a desktop computer, and the like. The decoder 200 receives encoded bitstreams transmitted via a transport layer of a network. The bitstreams may be sent from an encoder, from a storage device 204, from a device on the cloud via network 202, etc. During operation, decoder 200 receives and processes the frames of the bitstream as described herein. The decoder 200 outputs multi-channel audio signals and may transmit the multi-channel audio signals to a multi-channel audio player 206 having at least one loudspeaker for playback of the multi-channel audio signals. Storage device 204 may be part of a storage depository of multi-channel audio signals such as a storage repository of a store or a streaming music service, a separate storage component, a component of a mobile device, etc. Multichannel audio player may be a Bluetooth speaker, a device having at least one loudspeaker, a mobile device, a streaming music service, etc.

Figure 3:
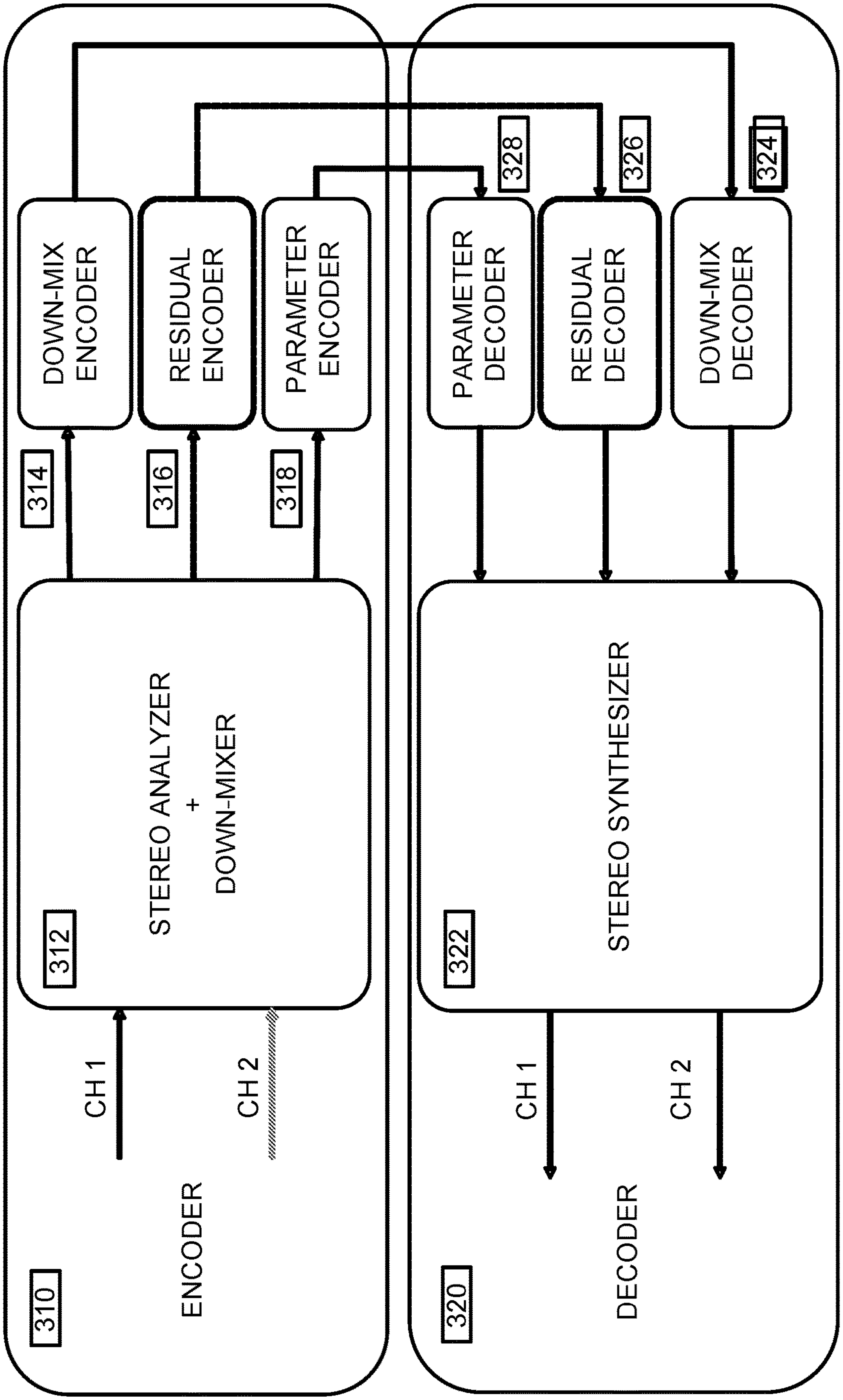
FIG. 3 is a block diagram illustrating components of a stereo encoder and decoder according to some embodiments.

While the parametric stereo reproduction gives good quality at low bitrates, the quality tends to saturate for increasing bitrates due to the limitation of the parametric model. To overcome this issue, the non-correlated component can be encoded. This encoding is achieved by simulating the stereo reconstruction in the encoder and subtracting the reconstructed signal from the input channel, producing a residual signal. If the down-mix transformation is revertible, the residual signal can be represented by only a single channel for the stereo channel case. Typically, the residual signal encoding is targeted to the lower frequencies which are psycho-acoustically more relevant while the higher frequencies can be synthesized with the decorrelator method. FIG. 3 is a block diagram depicting an embodiment of a setup for a parametric stereo codec including a residual coder. In FIG. 3, the encoder 310 may receive input signals, perform the processing described above in the stereo processing and down-mix block 312, encode the output via down-mix encoder 314, encode the residual signal via residual encoder 316, and encode the ITD, IPD, ILD, and ICC parameters via parameter encoder 318. The decoder 320 may receive the encoded output, the encoded residual signal, and the encoded parameters. The decoder 320 may decode the residual signal via residual decoder 326 and decode the down-mix signal via down-mix decoder 324. The parameter decoder 328 may decode the encoded parameters. The stereo synthesizer 322 may receive the decoded output signal and the decoded residual signal and based on the decode parameters, output stereo channels CH1 and CH2.

Figure 8:
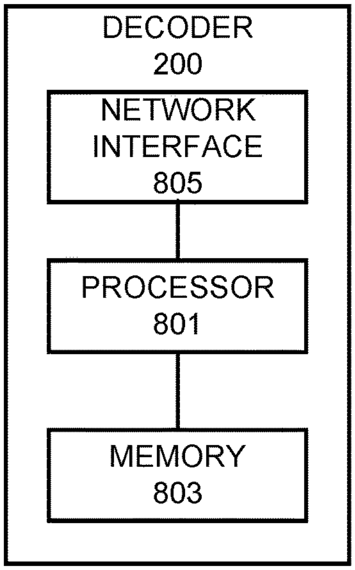
FIG. 8 is a block diagram illustrating a decoder according to some embodiments of inventive concepts.

FIG. 8 is a block diagram illustrating elements of decoder 200 configured to decode multi-channel audio frames and provide error recovery for lost or corrupt frames in predictive coding mode according to some embodiments of inventive concepts. As shown, decoder 200 may include a network interface circuit 805 (also referred to as a network interface) configured to provide communications with other devices/entities/functions/etc. The decoder 200 may also include a processor circuit 801 (also referred to as a processor) coupled to the network interface circuit 805, and a memory circuit 803 (also referred to as memory) coupled to the processor circuit. The memory circuit 803 may include computer readable program code that when executed by the processor circuit 801 causes the processor circuit to perform operations according to embodiments disclosed herein.

According to other embodiments, processor circuit 801 may be defined to include memory so that a separate memory circuit is not required. As discussed herein, operations of the decoder 200 may be performed by processor 801 and/or network interface 805. For example, processor 801 may control network interface 805 to transmit communications to multichannel audio players 206 and/or to receive communications through network interface 805 from one or more other network nodes/entities/servers such as encoder nodes, depository servers, etc. Moreover, modules may be stored in memory 803, and these modules may provide instructions so that when instructions of a module are executed by processor 801, processor 801 performs respective operations.

In the description that follows, the stereo decoder of a stereo encoder and decoder system as outlined in FIG. 3 may be used. Two channels will be used to describe the embodiments. These embodiments may be used with more than two channels. The multi-channel encoder 310 may process the input left and right channels in segments referred to as frames. The stereo analysis and down-mix block 312 may conduct a parametric analysis and produce a down-mix. For a given frame m the two input channels may be written $$\begin{cases} l(m, n) \\ r(m, n) \end{cases}$$

where l denotes the left channel, r denotes the right channel, n=0, 1, 2, . . . , N−1 denotes the sample number in frame m and N is the length of the frame. In an embodiment, the frames may be extracted with an overlap in the encoder such that the decoder may reconstruct the multi-channel audio signals using an overlap add strategy. The input channels may be windowed with a suitable windowing function w(n) and transformed to the Discrete Fourier Transform (DFT) domain.

$$\begin{cases} X_L(m, k) = \sum_{n=0}^{N-1} l(m, n)w(n)e^{-\frac{j2\pi kn}{N}} \\ X_R(m, k) = \sum_{n=0}^{N-1} r(m, n)w(n)e^{-\frac{j2\pi kn}{N}} \end{cases}$$

Note that other frequency domain representations may be used here, such as a Quadrature Mirror Filter (QMF) filter bank, a Hybrid QMF filter bank or an odd DFT (ODFT) representation which is composed of the MDCT (Modified Discrete Cosine Transform) and MDST (Modified Discrete Sine Transform) transform components.

For the parametric analysis, the frequency spectrum may be partitioned into bands b, where each band b corresponds to a range of frequency coefficients $$k=k_{start(b)} \ldots k_{end(b)}, b=0,1,2, \ldots N_{bands}-1$$

where $N_{bands}$ denote the total number of bands. The band limits are typically set to reflect the resolution of the human auditory perception which suggests narrow bands for low frequencies and wider bands for high frequencies. Note that different band resolution may be used for different parameters.

The signals may then be analyzed to extract the ITD, IPD and ILD parameters. In addition, the channel coherence may be analyzed, and an ICC parameter may be derived. The set of multi-channel audio parameters for frame m may be denoted P(m), which contains the complete set of ITD, IPD, ILD and ICC parameters used in the parametric representation. The parameters may be encoded by a parameter encoder 318 and added to the bitstream to be stored and/or transmitted to a decoder.

Before producing a down-mix channel, in one embodiment, it may be beneficial to compensate for the ITD and IPD to reduce the cancellation and maximize the energy of the down-mix. The ITD compensation may be implemented both in time domain before the frequency transform or in frequency domain, but it essentially performs a time shift on one or both channels to eliminate the ITD. The phase alignment may be implemented in different ways, but the purpose is to align the phase such that the cancellation is minimized. This ensures maximum energy in the down-mix. The ITD and IPD adjustments may be done in frequency bands or be done on the full frequency spectrum and the adjustments should preferably be done using the quantized ITD and IPD parameters to ensure that the modification can be inverted in the decoder stage.

The embodiments described below are independent of the realization of the IPD and ITD parameter analysis and compensation. In other words, the embodiments are not dependent on how the IPD and ITP are analyzed or compensated. In such embodiments, the ITD and IPD adjusted channels may be denoted with an apostrophe ('):

$$\begin{cases} X_L'(m,k) \\ X_R'(m,k) \end{cases}$$

The ITD and IPD adjusted input channels may then be down-mixed by the parametric analysis and down-mix block 312 to produce a mid/side representation, also called a down-mix/side representation. One way to perform the down-mix is to use the sum and difference of the signals.

$$\begin{cases} X_M(m,k) = \dfrac{(X_L'(m,k) + X_R'(m,k))}{2} \\ X_S(m,k) = \dfrac{(X_L'(m,k) - X_R'(m,k))}{2} \end{cases}$$

The down-mix signal $X_M(m,k)$ may be encoded by down-mix encoder 314 to be stored and/or transmitted to a decoder. This encoding may be done in frequency domain, but it may also be done in time domain. In the latter case a DFT synthesis stage is required to produce a time domain version of the down-mix signal, which is in turn provided to the down-mix encoder 314. The transformation to time domain may, however, introduce a delay misalignment with the multi-channel audio parameters that would require additional handling. In one embodiment, this delay misalignment is solved by introducing additional delay or by interpolating the parameters to ensure that the decoder synthesis of the down-mix and the multi-channel audio parameters are aligned.

The reconstruction of the side signal $X_S(m,k)$ may be generated from the down-mix and the obtained multi-channel audio parameters through a local parametric synthesis. A side signal prediction $X_{\hat{S}}(m,k)$ can be derived using the down-mix signal $$X_{\hat{S}}(m,k)=p(X_M(m,k))$$

where p(•) is a predictor function and may be implemented as a single scaling factor α which minimizes the mean squared error (MSE) between the side signal and the predicted side signal. Further, the prediction may be applied on frequency bands and involve a prediction parameter for each frequency band b.

$$X_{\hat{S}}(m,k)=\alpha_b X_M(m,k), k=k_{start(b)} \ldots k_{end(b)}$$

If the coefficients of band b are designated as column vectors $x_{\hat{S},b}(m)$ and $X_{M,b}(m)$, the minimum MSE predictor can be derived as $$\alpha_b = \frac{X_{M,b}(m)^T X_{S,b}(m)}{X_{M,b}(m)^T X_{M,b}(m)}$$

However, this expression may be simplified to produce a more stable prediction parameter. The prediction parameter $\alpha_b$ can be used as an alternative implementation of the ILD parameter. Further details are described in the prediction mode of Breebaart, J., Herre, J., Faller, C., Rödén, J., Myburg, F., Disch, S., . . . & Oomen, W. (2005). "MPEG spatial audio coding/MPEG surround: Overview and current status," 2005 In Preprint 119th Conv. Aud. Eng. Soc. (No. LCAV-CONF-2005-029). The prediction parameter $\alpha_b(m)$ is in turn encoded using an inter-frame predictive coding scheme, where differences between the frames m are considered. For each band b a difference from the reconstructed parameters $\hat{\alpha}_b(m)$ of the previous frame may be calculated $$\Delta\alpha_b(m)=\alpha_b(m)-\hat{\alpha}_b(m-1)$$

The encoder may choose to encode either $\alpha_b(m)$ or $\Delta\alpha_b(m)$, depending on which of them yields the lowest bit consumption. In an embodiment, $\alpha_b(m)$ and $\Delta\alpha_b(m)$ may be quantized using a scalar quantizer followed by an entropy coder on the quantizer indices. Arithmetic coding, Huffman coding and Golomb-Rice coding are examples of coding which may be used as an entropy coder. The entropy coder would assign smaller code words to small variations, i.e. small values of $\Delta\alpha_b(m)$. This means that the predictive coding using $\Delta\alpha_b(m)$ is likely to be used for stable audio scenes. For fast scene changes, resulting in large $\Delta\alpha_b(m)$, the bit consumption for the encoding of $\alpha_b(m)$ may be lower by using a non-predictive, or absolute encoding scheme. The encoding scheme thus may have two modes:

1) ABSOLUTE: encoding of $\alpha_b(m)$, and
2) PREDICTIVE: encoding of $\Delta\alpha_b(m)$.

The encoding mode $\alpha_{mode}(m) \in \{$ABSOLUTE, PREDICTIVE$\}$ would need to be encoded for each frame m, such that the decoder knows if the encoded value is 1) ABSOLUTE: $\hat{\alpha}_b(m)$, or
2) PREDICTIVE: $\Delta\hat{\alpha}_b(m)$.

Figure 1:
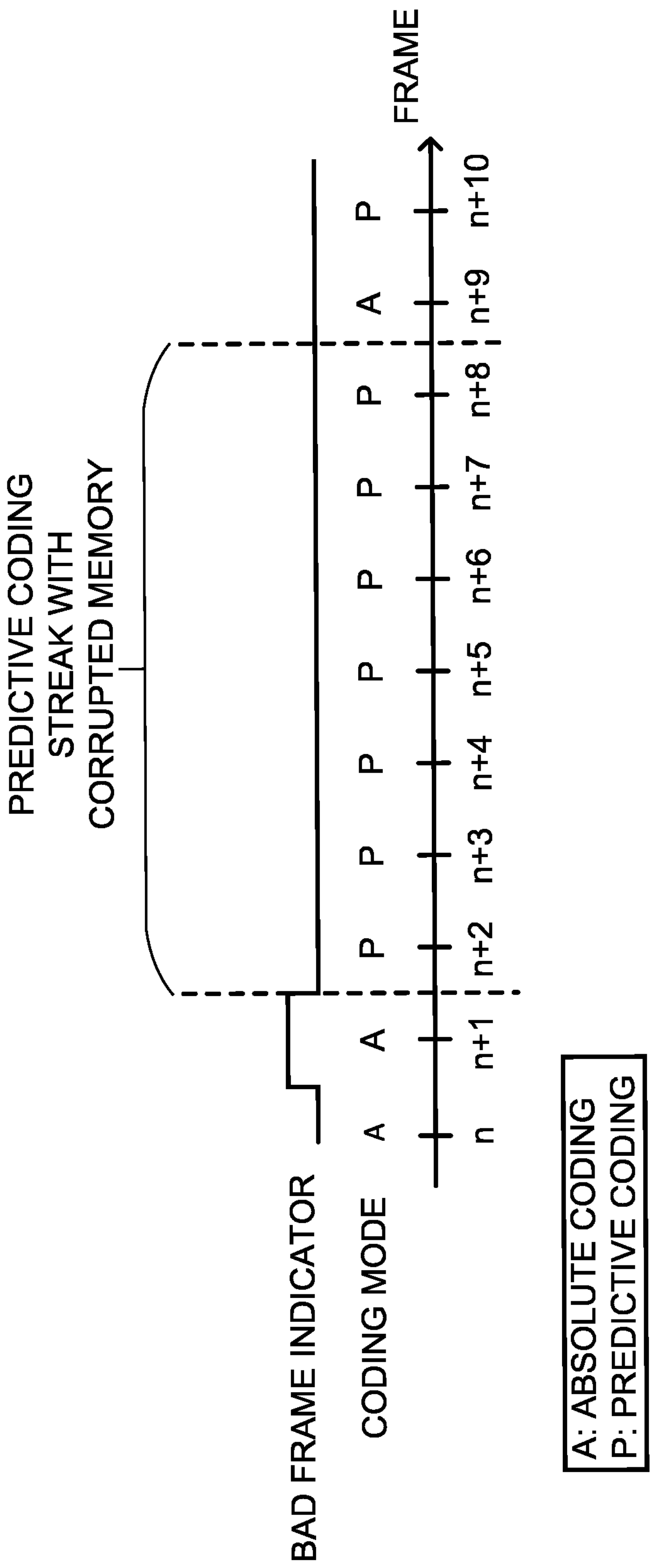
FIG. 1 is an illustration of error propagation.

Further variations of this encoding scheme are possible. For instance, if the prediction parameter $\alpha_b(m)$ shows high correlation with another parameter, such as the residual coding energy or a corresponding representation, it may be beneficial to encode those parameters jointly. The important part is that when the encoding scheme has a predictive coding mode and an absolute (non-predictive) coding mode, that this decision is encoded and signaled to the decoder. A sequence of consecutive PREDICTIVE coding modes may be referred to as a "predictive coding streak" or "predictive streak" and would be observed for audio segments where the scene is stable. If an audio frame in the onset of the predictive streak is lost, the parameters may suffer from error propagation during the entire streak (see FIG. 1). To reduce the effect of error propagation, ABSOLUTE coding may be forced at regular intervals which effectively limits the predictive streak to a maximum length in time.

After encoding, a local reconstruction of the parameter $\hat{\alpha}_b(m)$ is derived in the encoder and stored in memory to be used when encoding the next frame.

$$\hat{\alpha}_{b,mem} := \hat{\alpha}_b(m)$$

The decoding steps may be similar to the encoder steps. In the decoder:

$$\hat{\alpha}_b(m) = \begin{cases} \hat{\alpha}_b(m), & \alpha_{mode}(m) = \text{ABSOLUTE} \\ \Delta\hat{\alpha}_b(m) + \hat{\alpha}_{b,mem}, & \alpha_{mode}(m) = \text{PREDICTIVE} \end{cases}$$

While the predictive coding is described for the reconstructed values, it should be noted that it is also possible to conduct the predictive coding step on the quantizer indices. The principle of memory dependency however remains the same.

During error-free operation the local reconstruction in the encoder is identical to the reconstructed parameter $\hat{\alpha}_b(m)$ in the decoder. Note also that the memory $\hat{\alpha}_{b,mem}$ will be identical to reconstructed parameter values for frame m−1, $\hat{\alpha}_b(m-1)$. For the very first frame, the parameter memory may be set to some predefined value, e.g. all zeroes or the average expected value of the parameter.

Given the predicted side signal, a prediction residual $X_R(m,k)$ can be created.

$$X_R(m,k)=X_S(m,k)-X_{\hat{S}}(m,k)$$

The prediction residual may be inputted into a residual encoder 316. The encoding may be done directly in DFT domain or it could be done in time domain. Similarly, as for the down-mix encoder, a time domain encoder would require a DFT synthesis which may require alignment of the signals in the decoder. The residual signal represents the diffuse component which is not correlated with the down-mix signal. If a residual signal is not transmitted, a solution in one embodiment may be to substitute a signal for the residual signal in the stereo synthesis state in the decoder with the signal coming from a decorrelated version of the decoded down-mix signal. The substitute is typically used for low bitrates where the bit budget is too low to represent the residual signal with any useful resolution. For intermediate bit rates, it is common to encode a part of the residual. In this case the lower frequencies are often encoded, since they may be perceptually more relevant. For the remaining part of the spectrum, the decorrelator signal may be used as a substitute for the residual signal in the decoder. This approach is often referred to as a hybrid coding mode. Further details are provided in the decoder description below.

The representation of the encoded down-mix, the encoded multi-channel audio parameters, and the encoded residual signal may be multiplexed into a bitstream (not shown), which may be transmitted to a decoder 320 or stored in a medium for future decoding.

Within the decoder, a down-mix decoder 328 may provide a reconstructed down-mix signal $\hat{M}(m,n)$ which is segmented into DFT analysis frames m and n=0, 1, 2, . . . , N−1 denote the sample numbers within frame m. The analysis frames are typically extracted with an overlap which permits an overlap-add strategy in the DFT synthesis stage. The corresponding DFT spectra may be obtained through a DFT transform $$X_{\hat{M}}(m,k)=\sum_{n=0}^{N-1}\hat{M}(m,n)w(n)e^{-\frac{j2\pi kn}{N}}$$

where w(n) denotes a suitable windowing function. The shape of the windowing function can be designed using a trade-off between frequency characteristics and algorithmic delay due to length of the overlapping regions. Similarly, a residual decoder 326 produces a reconstructed residual signal $\hat{R}(m,n)$ for frame m and time instances n=0, 1, 2, . . . $N_R-1$. Note that the frame length $N_R$ may be different from N since the residual signal may be produced at a different sampling rate. Since the residual coding may be targeted only for the lower frequency range, it may be beneficial to represent it with a lower sampling rate to save memory and computational complexity. A DFT representation of the residual signal $X_{\hat{R}}(m,k)$ is obtained. Note that if the residual signal is upsampled in DFT domain to the same sampling rate as the reconstructed down-mix, the DFT coefficients will need to be scaled with $N/N_R$ and the $X_{\hat{R}}(m,k)$ would be zero-padded to match the length N. To simplify the notation, and since the embodiments are not affected by the use of different sampling rates, for purposes of better understanding, the sampling rates shall be equal and $N_R=N$ in the following description. Thus, no scaling or zero-padding shall be shown.

It should be noted that the frequency transform by means of a DFT is not necessary in case the down-mix and/or the residual signal is encoded in DFT domain. In this case, the decoding of the down-mix and/or residual signal provides the DFT spectrum that are necessary for further processing.

In an error free frame, often referred to as a good frame, the multi-channel audio decoder may produce the multi-channel synthesis using the decoded down-mix signal together with the decoded multi-channel audio parameters in combination with the decoded residual signal. For the case of the prediction parameter $\alpha_b(m)$ the decoder uses the mode parameter $\alpha_{mode}(m)$ to select the appropriate decoding mode and produces the reconstructed prediction parameter $\hat{\alpha}_b(m)$, $$\hat{\alpha}_b(m)=\begin{cases}\hat{\alpha}_b(m), & \alpha_{mode}(m)=\text{ABSOLUTE}\\ \Delta\hat{\alpha}_b(m)+\hat{\alpha}_{b,mem}, & \alpha_{mode}(m)=\text{PREDICTIVE}\end{cases}$$

The parameter memory is updated with the reconstructed prediction parameter $\hat{\alpha}_b(m)$.

$$\hat{\alpha}_{b,mem}:=\hat{\alpha}_b(m)$$

The decoded down-mix $x_{\hat{M}}(m,k)$, the stereo parameters P(m) and the residual signal $X_{\hat{R}}(m,k)$ are fed to the parametric stereo synthesis block 322 to produce the reconstructed stereo signal. After the stereo synthesis in DFT domain has been applied, the left and right channels are transformed to time domain and output from the stereo decoder.

In case the decoder detects a lost or corrupted frame, the decoder may use one or several PLC modules to conceal the missing data. There may be several dedicated PLC technologies to substitute the missing information, e.g. as part of the down-mix decoder, residual decoder or the parameter decoder. The goal of the PLC is to generate an extrapolated audio segment that is similar to the missing audio segment, and to ensure smooth transitions between the correctly decoded audio before and after the lost or corrupted frame.

The PLC method for the stereo parameters may vary. An example is to simply repeat the parameters of the previously decoded frame. Another method is to use the average stereo parameters observed for a large audio database, or to slowly converge to the average stereo parameters for consecutive frame losses (burst losses). The PLC method may update the parameter memory with the concealment parameters, or it may leave the parameter memory untouched such that the last decoded parameters remain. In any case, the memory will be out-of-synch with respect to the encoder.

Figure 4:
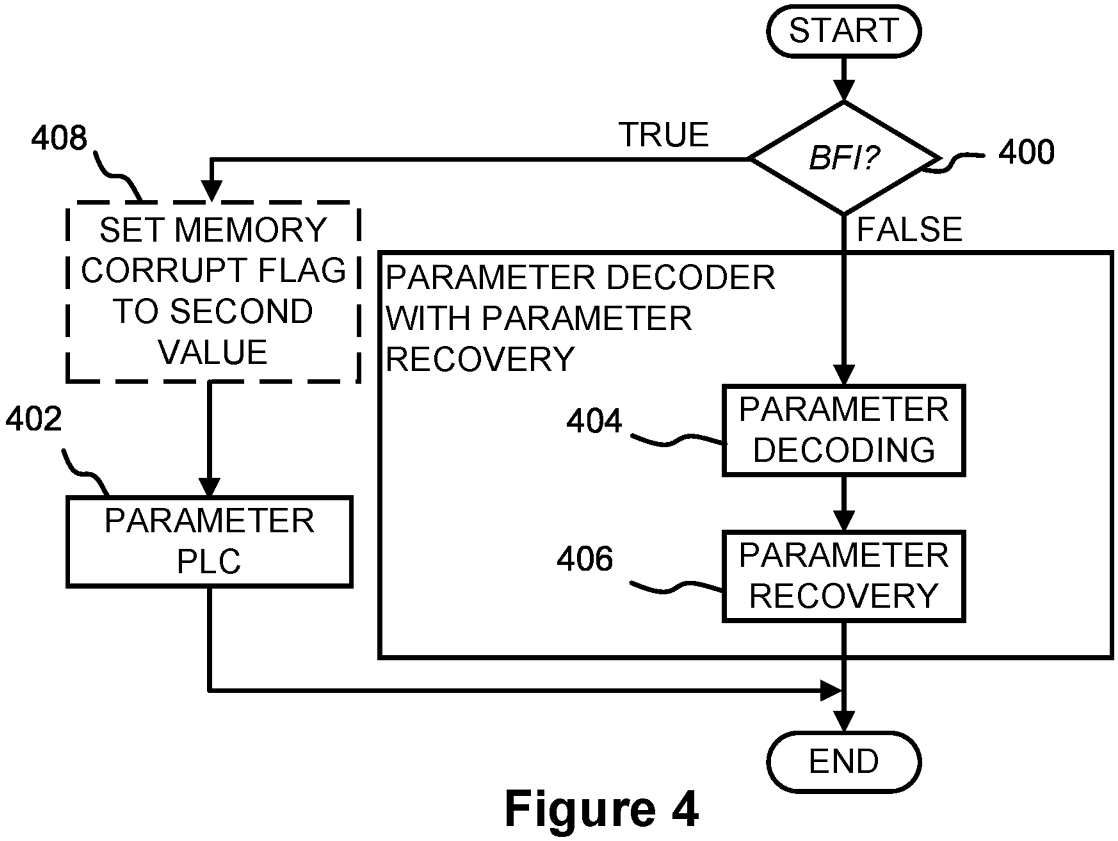
FIG. 4 is a flow chart illustrating operations of a decoder according to some embodiments of inventive concepts.

Turning to FIG. 4, a flow-chart of the decoder operation in an embodiment is provided. If a bad frame is indicated through the Bad Frame Indicator (BFI) at operation 400, the stereo decoder employs the packet loss concealment methods at operation 402. If the BFI is not active, normal decoding is used in operation 404. After the normal decoding, the parameter recovery operation 406 is run. In an embodiment described below in the description of FIGS. 13 and 14, operation 408 is performed. In operation 408, a memory corrupt flag may be set to a second value (e.g., TRUE) that indicates that a bad frame indicator is true.

Figure 5:
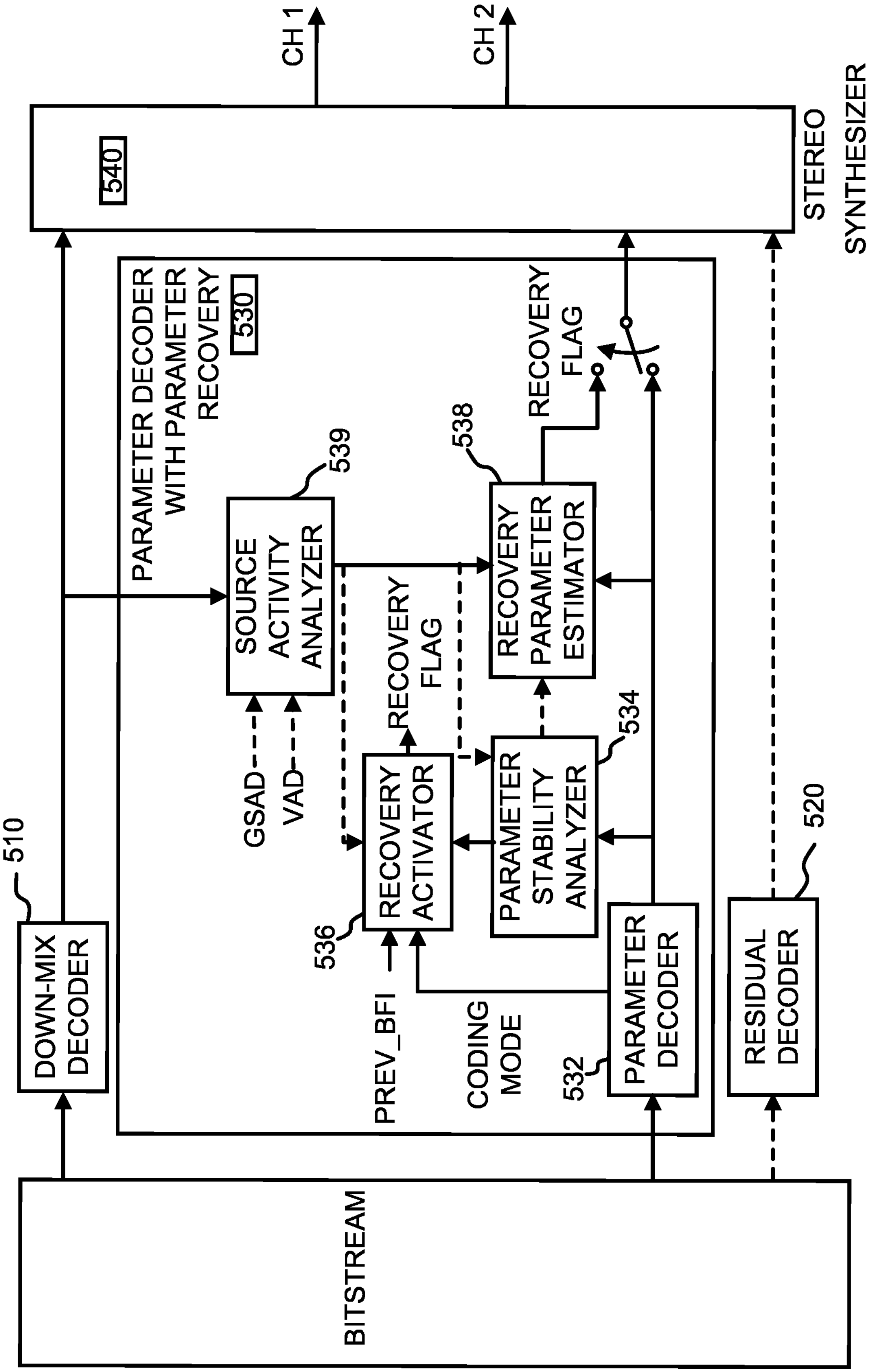
FIG. 5 is a block diagram illustrating operations of a decoder according to provide error recovery according to some embodiments of inventive concepts.

In more detail, the error-free decoding operations may be described as outlined by FIG. 5. FIG. 5 may be compared to the stereo decoder block 320 of FIG. 3. FIG. 5 provides a down-mix decoder 510 and optionally a residual decoder 520. The decoder has a parameter decoder with parameter recovery 530 that is described in more detail below.

The parameter decoder 532 may perform decoding of the stereo parameters using either an absolute coding mode or a predictive coding mode. In the description below, a reconstructed side signal prediction parameter $\hat{\alpha}_b(m)$ shall be used for the error recovery method. In the parameter stability analyzer block 534, a parameter stability measure may be determined. An example of a stability measure is to use the squared Euclidian distance between the reconstructed parameter vectors for each frame and apply a low-pass filtering to this value. This example may be derived in accordance with:

$$D(m) = \frac{1}{N_{bands}} \sum_{b=0}^{N_{bands}-1} (\hat{\alpha}_b(m) - \hat{\alpha}_b(m-1))^2$$

$$D_{LP}(m) = \gamma D(m) + (1-\gamma) D(m-1)$$

The filter parameter $\gamma$ may be a low value to create a slowly evolving stability measure, typically in the range [0.01,0.3]. In one embodiment a value of $\gamma=0.1$ is used. A stability decision can be formed by comparing the low-pass filtered squared distance to a fixed threshold.

$$D_{LP}(m) < D_{THR}$$

$D_{THR}$ may depend on the range of the parameter $\alpha_b$. For example, when the range for $\alpha_b$ is [−1.0,1.0], one suitable value for the threshold is $D_{THR}=0.05$. Other suitable values for the threshold may be used, e.g. in the range $D_{THR} \in [0.01, 0.3]$. In a further embodiment, the parameter stability analyzer 534 may derive the parameter stability measure only when the source is an active source as indicated with the dashed line between the source activity analyzer 539 and the parameter stability analyzer 534. In yet another embodiment, the parameter stability analyzer 534 may derive the parameter stability measure only when the recovery flag is not enabled.

Note that the stability measure defined here gives low values for stable signals and high values for unstable signals. It would also be possible to define a stability measure based on e.g. the inverse of the low-pass filtered squared distance, $$S(m) = \frac{1}{D_{LP}(m)} \text{ and } S_{THR} = \frac{1}{D_{THR}},$$

or the negative low-pass filtered squared distance $S'(m) = -D_{LP}(m)$ and $S_{THR}' = -D_{THR}$. An equivalent stability decision could then be formulated as $S(m) > S_{THR}$ and $S'(m) > S_{THR}'$ respectively. S(m) and S'(m) would have high values for stable signals and low values for unstable signals.

The stability measure using the squared Euclidian distance represents one way to determine the parameter stability. However, in other embodiments, a weighting of the parameter differences is included which takes the band energy of the down-mix into account. An alternative expression for the stability would then be $$D(m) = \frac{1}{N_{bands}} \sum_{b=0}^{N_{bands}-1} (\hat{\alpha}_b(m) - \hat{\alpha}_b(m-1))^2 \cdot w_b(m)$$

-continued $$w_b(m) = \frac{1}{k_{end(b)} - k_{start(b)} + 1} \sum_{k=k_{start(b)}}^{k_{end(b)}} X_{\hat{M}}(m, k)^2$$

This weighting emphasizes the high energy bands in the stability measure D(m). It may further be desirable to update the stability measure only during frames that are classified as coming from an active source (see below), or to normalize the weighting with an estimate of the current peak energy or noise floor level.

Based on the output of the down-mix decoder 510, an energy analysis may be conducted by the source activity analyzer block 539. The purpose of the energy analysis is to decide whether the current frame represents a dominant or active source in the audio scene for which the parameter estimate will be updated. This energy analysis may be implemented in several ways. Voice Activity Detection (VAD) or Generic Sound Activity Detection (GSAD) methods may be used here. Such methods are not necessarily limited to energy analysis and may include estimates of the spectral shapes of the background and active sources. These methods may however come at a relatively high computational cost. However, when these methods are used in other operations and made available to the decoder, they may be used in place of the techniques described below to determine whether the current frame represents a dominant or active source. When these techniques are used, the decoder detects whether the source is active by receiving an indication from one of a voice activity detector or a generic sound activity detector that the current frame represents an active source.

Figure 10:
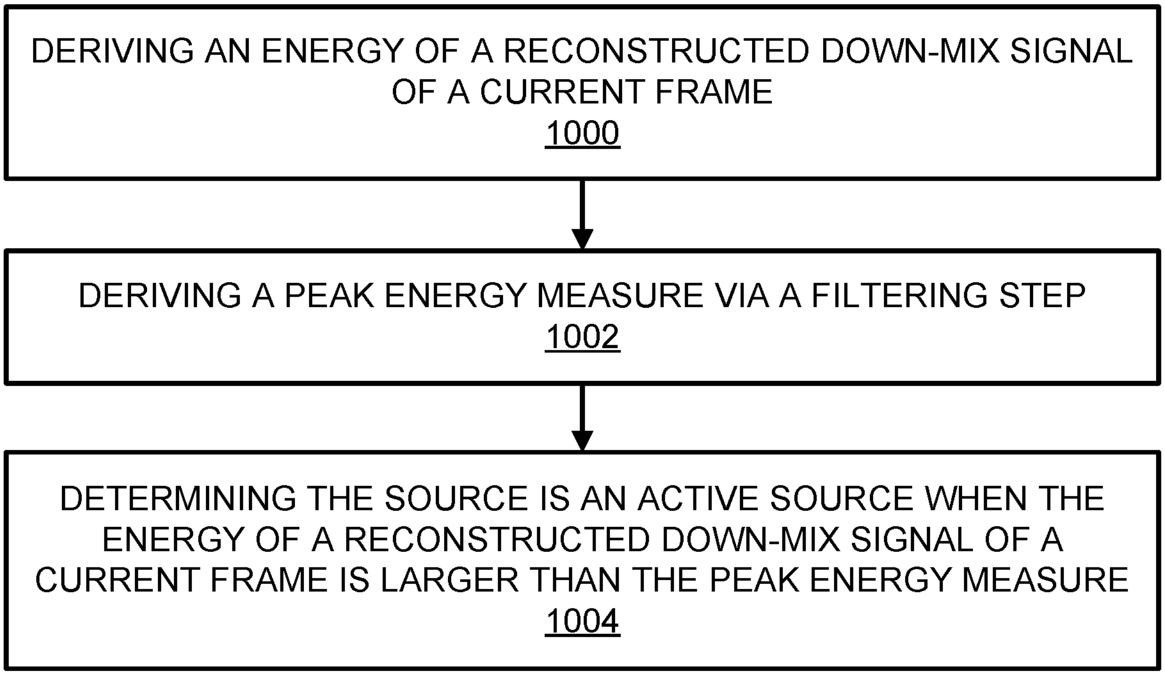

A computationally less costly technique that may be fit for this purpose, is to keep a memory of the peak energy using a fast-attack-slow-decay approach. Turning to FIG. 10, in this approach, in operation 1000, the energy of the reconstructed down-mix signal of the current frame m is derived.

$$E_{DMX}(m) = \Sigma_{k=0}^{N-1} X_{\hat{M}}(m,k)^2$$

Then, in operation 1002, a peak energy measure may be derived through a conditional filtering step.

$$E_{DMX,PEAK}(m) = \beta E_{DMX}(m) + (1-\beta) E_{DMX,PEAK}(m-1)$$

$$\beta = \begin{cases} \beta_{attack}, & E_{DMX}(m) \geq E_{DMX,PEAK}(m-1) \\ \beta_{decay}, & E_{DMX}(m) < E_{DMX,PEAK}(m-1) \end{cases}$$

where the filter parameter $\beta_{attack}$ should be higher than $\beta_{decay}$. For example, in one embodiment $\beta_{attack}$ may be in the range [0.5,1.0] while $\beta_{decay}$ may be in the range [0.01,0.3]. An example of the filter parameters $\beta_{attack}$ and $\beta_{decay}$ is $$\begin{cases} \beta_{attack} = 1.0 \\ \beta_{decay} = 0.05 \end{cases}$$

In operation 1004, the source for the current audio frame may be considered active whenever the down-mix energy of the current frame is above the peak energy measure, i.e. when $\beta=\beta_{attack}$, or when $$E_{DMX}(m) \geq E_{DMX,PEAK}(m-1)$$

Figure 11:
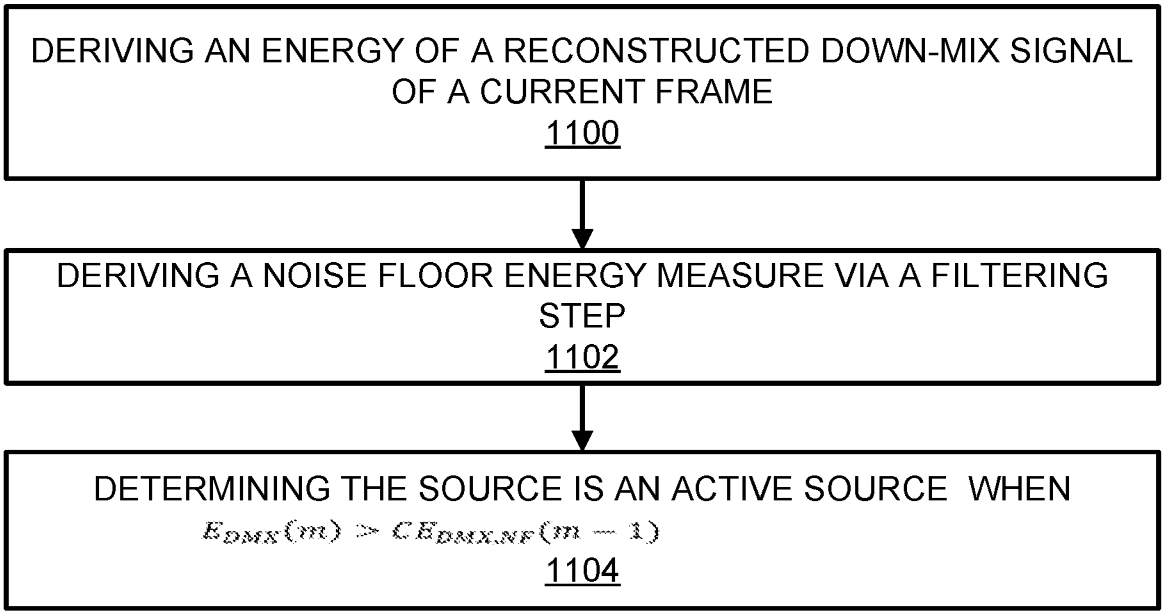

Turning to FIG. 11, an alternative for following the peak energy is to follow the noise floor energy $E_{DMX,NF}(m)$ and classify frames as high energy when they are above a threshold relative to the noise floor energy. In operation 1100, the energy of the reconstructed down-mix signal of the current frame m is derived as provided above in operation 1000. In operation 1102, a noise floor energy is derived via a filtering step, which can be realized by switching the conditions in the β parameter:

$$E_{DMX,NF}(m) = \beta E_{DMX}(m) + (1-\beta)E_{DMX,NF}(m-1)$$

$$\beta = \begin{cases} \beta_{attack}, & E_{DMX}(m) < E_{DMX,NF}(m-1) \\ \beta_{decay}, & E_{DMX}(m) \geq E_{DMX,NF}(m-1) \end{cases}$$

In operation 1104, the energy may be considered high (i.e., the source is an active source) when the current energy is at a certain level above the noise floor $$E_{DMX}(m) > CE_{DMX,NF}(m-1)$$

For example, setting $C=10^{6/20}\approx 2$ would set the decision threshold at 6 dB above the estimated noise floor.

Returning to FIG. 5, a recovery parameter estimator block 538 may keep a memory of the last observed active source parameters. If the source activity analyzer 539 signals that the frame is active, a parameter estimate $\hat{\alpha}_{b,est}$ is updated. As an example, the parameters of the current frame may be stored as the parameter estimate $$\hat{\alpha}_{b,est} := \hat{\alpha}_b(m)$$

It may also be desirable to apply a low-pass filtering to achieve a more stable estimate, e.g.

$$\hat{\alpha}_{b,est} := \gamma_{est}\hat{\alpha}_b(m) + (1-\gamma_{est})\hat{\alpha}_{b,est}$$

Here the assignment operator ':=' is used to illustrate that the estimate memory is overwritten. Thus, the decoded parameters are filtered using a low-pass filter and the filtered decoded parameters are stored as the estimated parameters. An alternative description would be to write the estimate depending on frame m $$\hat{\alpha}_{b,est}(m) := \gamma_{est}\hat{\alpha}_b(m) + (1-\gamma_{est})\hat{\alpha}_{b,est}(m-1)$$

The filter parameter $\gamma_{est}$ should be set relatively low for a slowly evolving parameter estimate, e.g. in the range [0.01, 0.3]. The parameter update may further be done only when the parameters are judged to be stable, as indicated with the dashed line between the parameter stability analyzer 534 and the recovery parameter estimator 538.

Figure 6:
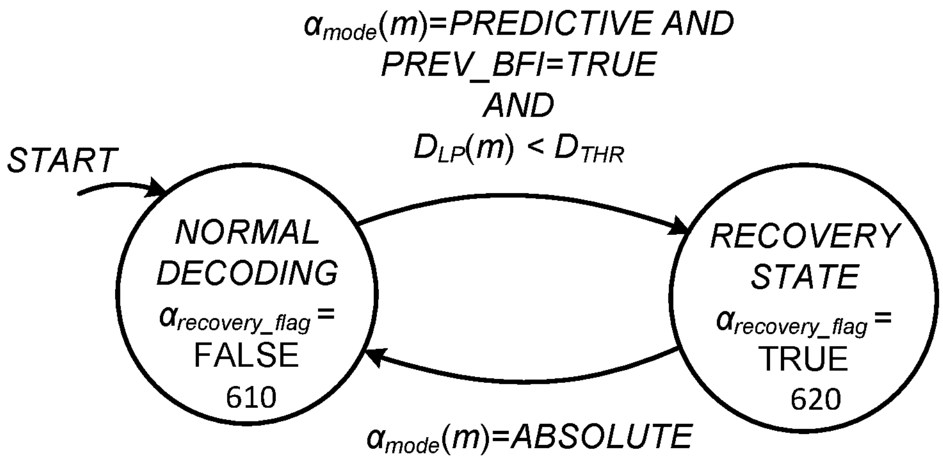
FIG. 6 is a block diagram illustrating a state machine according to some embodiments of inventive concepts.

The recovery activator block 536 contains the recovery decision logic to decide whether the recovery algorithm is active or not. The logic can be described by a state machine as outlined in FIG. 6. The starting state 610 represents the normal decoding mode where $\alpha_{recovery\_flag}$=FALSE. In case the decoder is in a predictive mode $\alpha_{mode}$=PREDICTIVE and, the previous frame was a bad frame PREV_BFI=TRUE and the parameters are stable $D_{LP}<D_{THR}$, the recovery state 620 is entered where the recovery flag is set $\alpha_{recovery\_flag}$:=TRUE. If, while in the recovery state 620, the decoder is in an absolute decoding mode $\alpha_{mode}$=ABSOLUTE, the normal decoding state 610 is entered and the recovery flag is unset $\alpha_{recovery\_flag}$:=FALSE.

If the recovery flag is set $\alpha_{recovery\_flag}$=TRUE, the decoded parameters are substituted with the estimated parameters $$\hat{\alpha}_b(m) := \hat{\alpha}_{b,est}$$

In another embodiment, since the parameters $\hat{\alpha}_b$(m) are now being substituted, the parameter estimate and parameter stability measure may not be updated. Effectively this means $D_{LP}(m)=D_{LP}(m-1)$.

The output of the parameter decoder with parameter recovery block 530 may be input to the stereo synthesizer block 540 together with the output of the down-mix decoder block 510 and potentially the residual decoder block 520.

Figure 7:
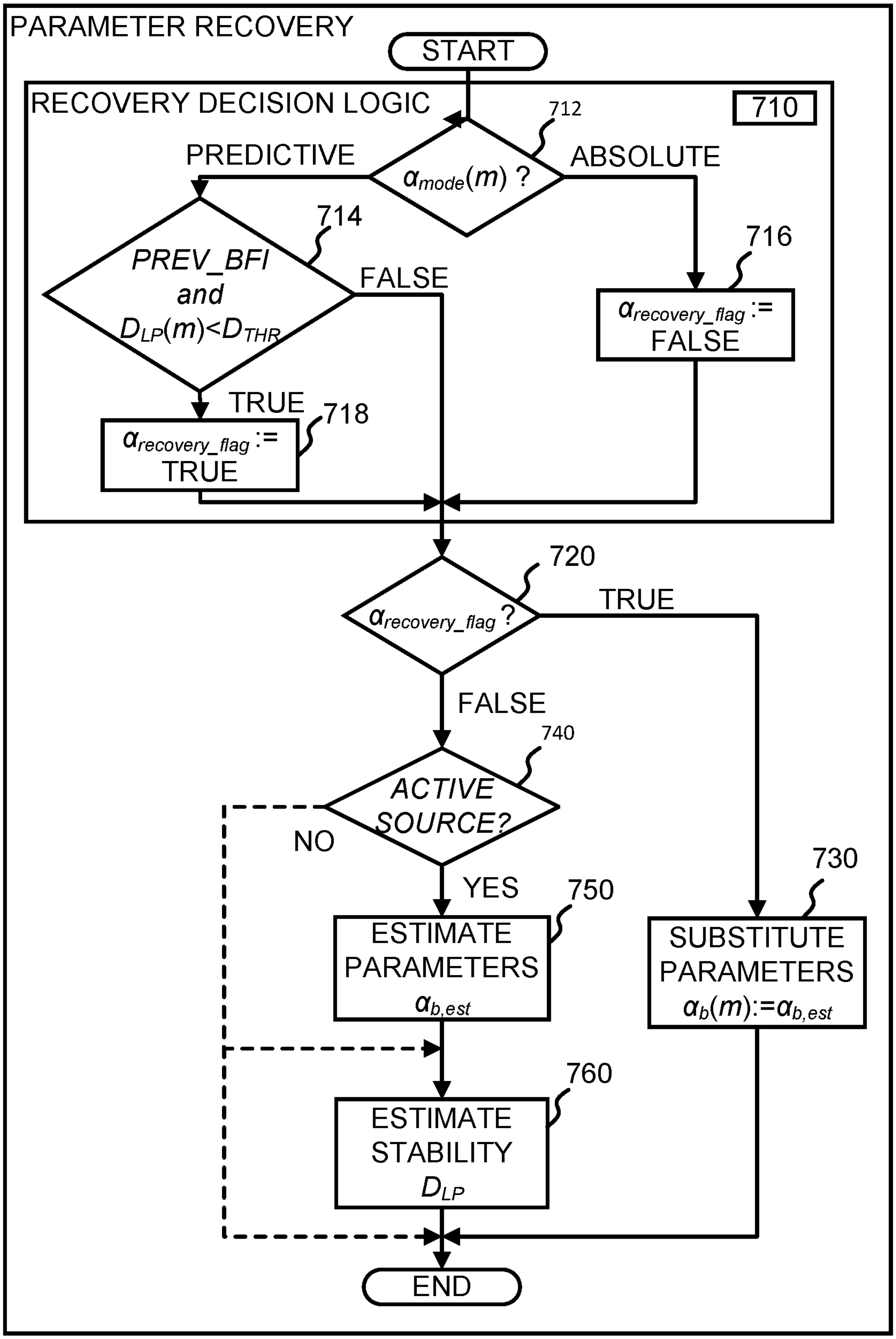
FIG. 7 is a block diagram illustrating operations to generate substitute parameters according to some embodiments of inventive concepts.

The operation of the parameter decoder with parameter recovery can also be described by the flow-chart in FIG. 7. The recovery decision logic 710 starts with an operation which checks the $\alpha_{mode}$(n) parameter in operation 712. If the decoding mode is ABSOLUTE, the recovery flag is unset in operation 716 $\alpha_{recovery\_flag}$:=FALSE. In case of PREDICTIVE decoding mode, if the PREV_BFI is set and $D_{LP}$(m) $<D_{THR}$ in operation 714, the recovery flag is set in operation 718 $\alpha_{recovery\_flag}$:=TRUE. When the recovery flag is set to TRUE as determined in operation 720, the parameter substitution is carried out in operation 730 where the estimated parameters are retrieved and used to replace decoded parameters of the current frame with the estimated parameters. The parameter estimation and stability estimation may not be done when the recovery flag is set to TRUE. When the recovery flag is not set to TRUE as determined in operation 720, the source activity is considered in operation 740. If the frame represents an active source, the parameter estimate is updated in operation 750. If the frame does not represent an active source, the parameter estimate is left untouched for this frame. The stability estimate $D_{LP}$ is then updated in step 760. Alternatively, step 760 may be skipped when the frame does not represent an active source, as indicated with the dashed arrow in FIG. 7.

Figure 9:
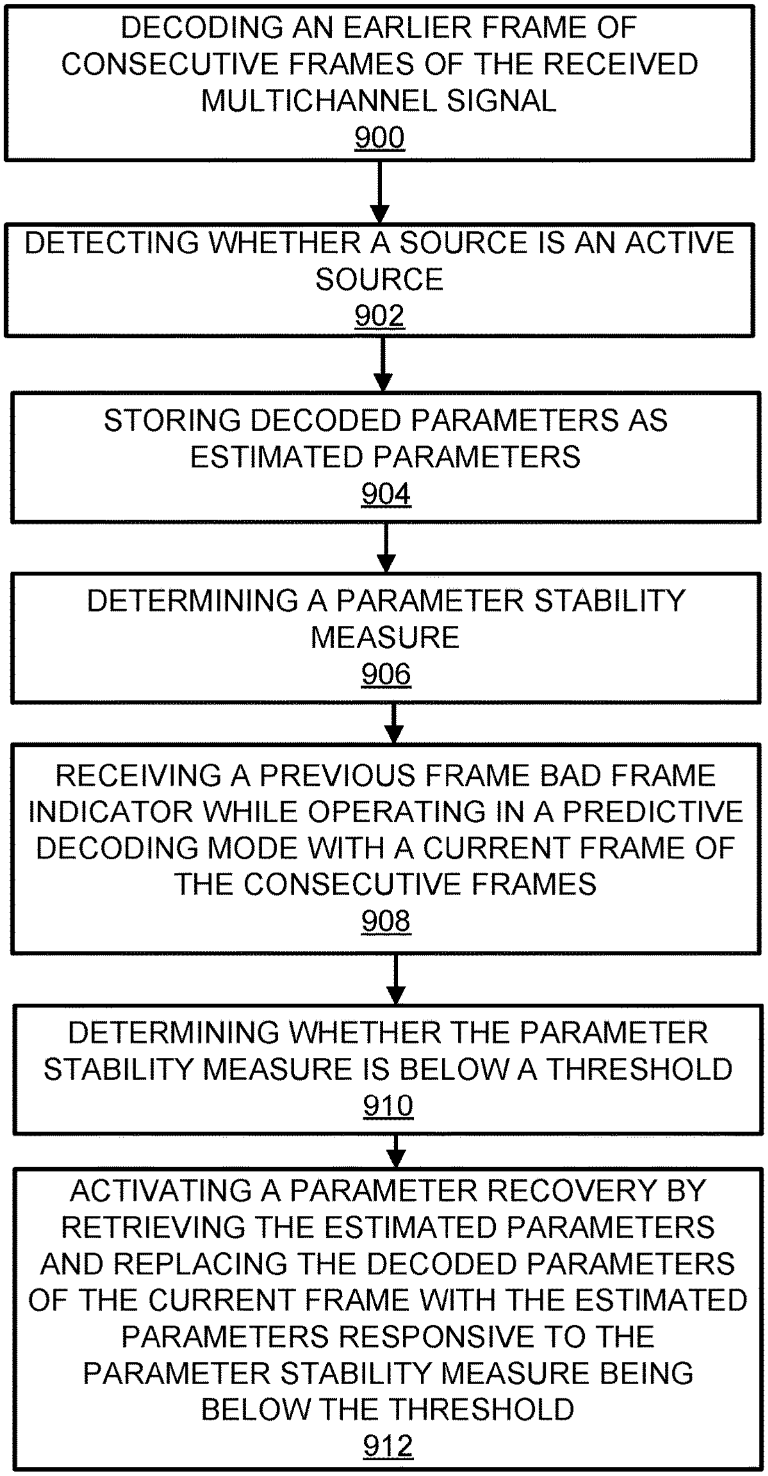
FIGS. 9-14 are flow charts illustrating operations of a decoder in accordance with some embodiments of inventive concepts.

The operation of the parameter decoder with parameter recovery can also be described by the flow-chart in FIG. 9 when decoding consecutive frames. In operation 900 the processor 801 of decoder 200 may decode an earlier frame of the consecutive frames of the received multichannel signal. The term "earlier" in this respect defines a temporal distinction of when the steps of the claimed method are performed. Every time a frame is the current frame under consideration, it is decoded and the following steps 900 to 906 are carried out. The subsequent steps may be carried out at a later point of time, i.e. when processing a current frame, the earlier frames may have already been dealt with and processed. The respective parameter stability measure may already be available and may not need to be calculated each time for all previous frames.

In operation 902, the decoder 200 may detect whether a source is an active source. Responsive to the source being an active source, the processor 801 may store decoded parameters as estimated parameters in operation 904 and determine a parameter stability measure in operation 906. It is to be noted that stored parameters and the parameter stability measure are (retrieved from a memory and) used when processing a frame at a later point of time, i.e. when processing a frame succeeding a bad frame.

In operation 908, the processor 801 receives a previous frame bad frame indicator while operating in a predictive code mode when decoding a current frame of the consecutive frames. The previous frame bad frame indicator may be derived from monitoring a bad frame indicator or based on a flag in a data packet received from a transport layer. Responsive to receiving the previous frame bad frame indicator, the processor 801 determines whether the parameter stability measure is below a threshold in operation 910.

In operation 912, the processor 801 activates a parameter recovery by retrieving the estimated parameters and replacing decoded parameters of the current frame with the estimated parameters responsive to the parameter stability measure being below the threshold.

Figure 12:
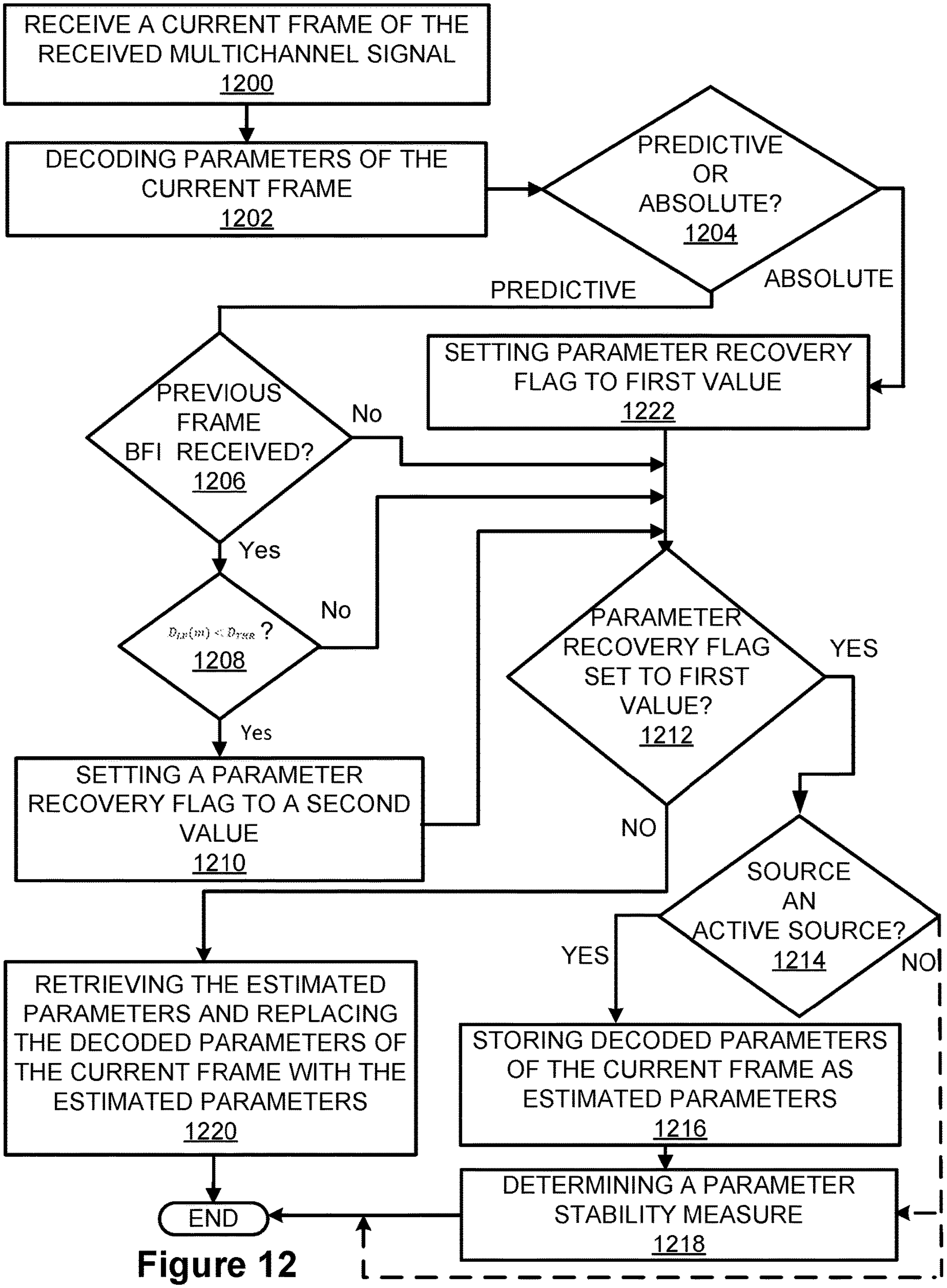

The operation of the parameter decoder with parameter recovery can also be further described by the flow-chart in FIG. 12.

In operation 1200, the processor 801 of decoder 200 may receive, via interface 805, a current frame of the received multichannel signal. In operation 1202, processor 801 decodes parameters of the current frame of the received multichannel signal.

In operation 1204, processor 801 determines whether the decoder should be operating in the absolute decoding mode or in the predictive coding mode. The decoder 200 may receive the coding mode from the encoder.

Responsive to determining that the decoder should be operating in the predictive coding mode, the processor 801 in operation 1206 determines if a previous frame bad frame indicator (BFI) has been received. In one embodiment, this may be a flag derived from a flag in a data packet message. Responsive to the previous frame BFI being received or set, the processor 801 in operation 1208 determines whether a parameter stability measure is below a threshold (e.g., $D_{LP}(m)<D_{THR}$.)

Responsive to the parameter stability measure being below a threshold (and the previous frame BFI has been received), the processor 801 in operation 1210 may set a parameter recovery flag to a second value (e.g., TRUE). This operation may be similar to operation 718 of FIG. 7.

In operation 1212, the processor 801 may determine whether the parameter recovery flag is set to the first value. Alternatively, processor 801 may determine whether the parameter recovery flag is set to the second value.

Responsive to the parameter recovery flag being set to the first value, the processor 801 performs operations 1214 to 1218.

In operation 1214, processor 801 may detect whether the source is an active source. Examples of detecting whether the source is an active source is described above with respect to FIGS. 10 and 11.

Responsive to determining the source is an active source, processor 801 may store decoded parameters of the current frame as estimated parameters in operation 1216. In operation 1218, the processor 801 may determine a parameter stability measure as described above with respect to the parameter stability analyzer block 534.

Responsive to determining the source is not an active source, processor 801 may determine a parameter stability measure in operation 1218 as described above with respect to the parameter stability analyzer block 534. In one implementation of this embodiment, operation 1218 is an optional step and may not be performed as indicated by the dashed lines in FIG. 12.

Responsive to the parameter recovery flag not being set to the first value (i.e., the parameter recovery flag has been set to the second value), the processor 801 performs operation 1220. Specifically, in operation 1220, the processor 801 may retrieve the estimated parameters from storage and use the estimated parameters to replace the decoded parameters of the current frame.

Responsive to determining the decoder should be operating in the absolute coding mode in operation 1204, the processor 801 may set the parameter recovery flag to the first value (e.g., FALSE) in operation 1222. This operation is similar to operation 716 of FIG. 7.

After performing operation 1222, the processor 801 performs operations 1214 to 1218. The processor 801 may also perform operation 1212 prior to performing operations 1214 to 1218.

In yet another embodiment, updating the estimated parameters and the stability measure (e.g., operations 1216 and 1218 of FIG. 12) may not be done after a bad frame has been indicated. Turning to FIG. 4, in this embodiment, a memory corrupt flag is set to a second value responsive to the BFI has been set to a true value in operation 408. The memory corrupt flag is used to prohibit updating the estimated parameters and the stability measure since the parameter memory and hence the decode parameters are corrupted as a result of the bad frame. Alternatively, one may expand the parameter recovery flag to provide another value:

Recovery_mode={NORMAL_DECODING,RECOVERY_MODE,MEMORY_CORRUPT}

The "normal decoding" and "recovery mode" values correspond to the first value and second value in FIG. 12. The "memory corrupt" value may indicate that the memory is corrupted as a result of the parameter PLC processing performed in operation 402 (see FIG. 4). In the description that follows operations described above with respect to FIG. 12 will be used in describing certain operations of this embodiment.

Figure 13:
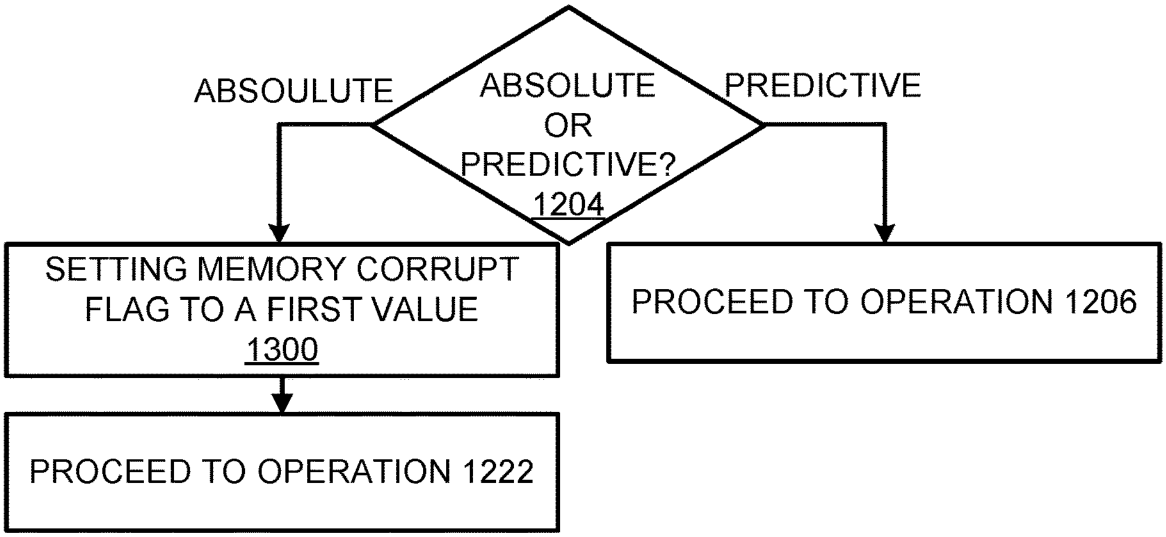

Turning to FIG. 13, when the processor 801 determines the decoder should be operating in the absolute decoding mode in operation 1204 of FIG. 12, the processor 801 in operation 1300 sets the memory corrupt flag to a first value (e.g., FALSE) of the memory corrupt flag that indicates the memory has been reset with stored decoded parameters as estimated parameters. The processor 801 proceed with setting the parameter recovery flag to the first value as described in operation 1222 of FIG. 12. When the processor 801 determines the decoder should be operating in the predictive decoding mode in operation 1204 of FIG. 12, the processor 801 proceeds to determining if a previous frame BFI has been received as described in operation 1206 of FIG. 12.

Figure 14:
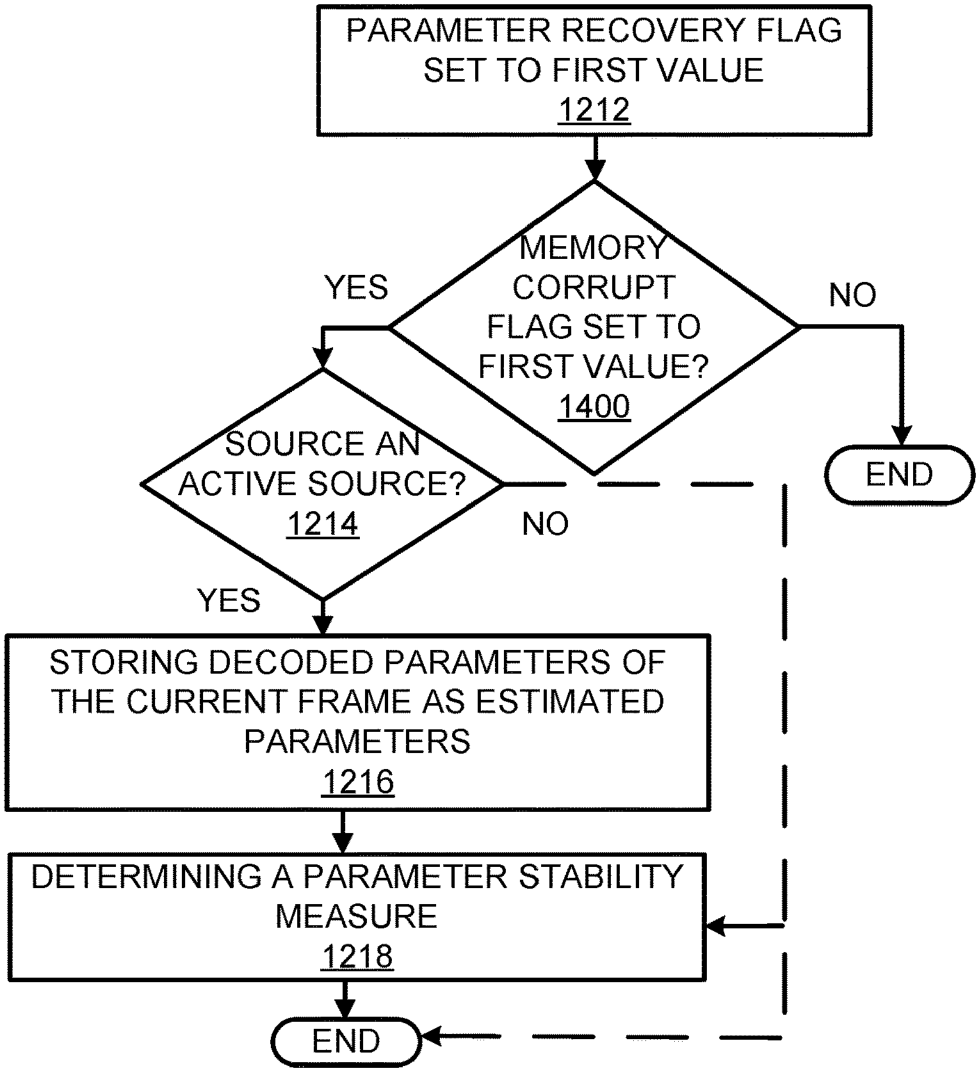

FIG. 14 illustrates how the memory corrupt flag may be used in this embodiment. Responsive to the processor 801 determining that the parameter recovery flag has been set to the first value of the parameter recovery flag, the processor 801 determines whether the memory corrupt flag is set to the first value of the memory corrupt flag in operation 1400. Responsive to the memory corrupt flag has been set to the first value of the memory corrupt flag, a determination may be made as to whether the source is an active source as described above in operation 1214. Operations 1216 and 1218 may be performed as described above in the description of FIG. 12. Responsive to the memory corrupt flag has been set to the second value, operations 1214 to 1218 are not performed.

Note that the terms: "first value" and "second value" are used for the parameter recovery flag and for the memory corrupt flag. "First value" may refer to the flag as being unset/disabled and "second value" may indicate that the flag is set/enabled.

Listing of Embodiments

1. A method of replacing decoded parameters in a received multichannel signal in a decoder device comprising a processor, the method comprising the processor performing operations comprising:
   - decoding (900) an earlier frame of consecutive frames of the received multichannel signal;
   - detecting (740, 902) whether a source is an active source;

responsive to determining the source is an active source:

storing (904) decoded parameters of the earlier frame as estimated parameters; and determining (906) a parameter stability measure;

responsive to receiving (908) a previous frame bad frame indicator while operating in a predictive decoding mode with a current frame of the consecutive frames:

determining (910) whether the parameter stability measure is below a threshold; and activating (730, 912) a parameter recovery by retrieving the estimated parameters and replacing decoded parameters of the current frame with the estimated parameters responsive to the parameter stability measure being below the threshold.

2. The method of Embodiment 1, wherein detecting whether the source is an active source comprises:

receiving an indication from one of a voice activity detector or a generic sound activity detector that the current frame represents an active source.

3. The method of Embodiment 1, wherein detecting whether the source is an active source comprises:

deriving (1000) an energy of a reconstructed down-mix signal of the current frame in accordance with $$E_{DMX}(m)=\Sigma_{k=0}^{N-1}X_{\hat{M}}(m,k)^2$$

deriving (1002) a peak energy measure via a filtering step in accordance with $$E_{DMX,PEAK}(m) = \beta E_{DMX}(m) + (1-\beta)E_{DMX,PEAK}(m-1)$$

$$\beta = \begin{cases} \beta_{attack}, & E_{DMX}(m) \geq E_{DMX,PEAK}(m-1) \\ \beta_{decay}, & E_{DMX}(m) < E_{DMX,PEAK}(m-1) \end{cases}; \text{ and}$$

determining (1004) the source is an active source when the energy of the reconstructed down-mix signal of the current frame is larger than the peak energy measure, where $X_{\hat{M}}(m,k)$ is the reconstructed down-mix signal, $E_{DMX}(m)$ is the energy of the reconstructed down-mix signal, $E_{DMX,PEAK}$ is a peak energy, $\beta_{attack}$ is a first filter parameter in a first range between 0.5 and 1.0 and $\beta_{decay}$ is a second filter parameter in a range between 0.01 and 0.3.

4. The method of Embodiment 1, wherein detecting whether the source is an active source comprises:

deriving (1100) an energy of a reconstructed down-mix signal of the current frame in accordance with $$E_{DMX}(m)=\Sigma_{k=0}^{N-1}X_{\hat{M}}(m,k)^2$$

deriving (1102) a noise floor energy measure via a filtering step in accordance with $$E_{DMX,NF}(m) = \beta E_{DMX}(m) + (1-\beta)E_{DMX,NF}(m-1)$$

$$\beta = \begin{cases} \beta_{attack}, & E_{DMX}(m) < E_{DMX,NF}(m-1) \\ \beta_{decay}, & E_{DMX}(m) \geq E_{DMX,NF}(m-1) \end{cases}; \text{ and}$$

determining (1104) the source is an active source when $E_{DMX}(m)>CE_{DMX,NF}(m-1)$ where $X_{\hat{M}}(m,k)$ is the reconstructed down-mix signal, $E_{DMX}(m)$ is the energy of the reconstructed down-mix signal, $E_{DMX,NF}$ is a noise-floor energy, $\beta_{attack}$ is a first filter parameter, $\beta_{decay}$ is a second filter parameter, and C is a threshold parameter 5. The method of Embodiment 4 wherein $C=10^{6/20}$.

6. The method of any of Embodiments 1-5 further comprising determining the parameter stability measure in accordance with $$D(m) = \frac{1}{N_{bands}}\sum_{b=0}^{N_{bands}-1}(\hat{\alpha}_b(m) - \hat{\alpha}_b(m-1))^2$$

$$D_{LP}(m) = \gamma D(m) + (1-\gamma)D(m-1)$$

where D(m) is a squared Euclidian distance between reconstructed parameter vectors for each frame of the received multichannel signal, $\hat{\alpha}_b(m)$ is a reconstructed prediction parameter, $N_{bands}$ is a total number of frequency bands, $\gamma$ is a filter parameter, and $D_{LP}(m)$ is a low pass filtered D(m).

7. The method of Embodiment 6 further comprising weighting the squared Euclidian distance in accordance with $$D(m) = \frac{1}{N_{bands}}\sum_{b=0}^{N_{bands}-1}(\hat{\alpha}_b(m) - \hat{\alpha}_b(m-1))^2 \cdot w_b(m)$$

$$w_b(m) = \frac{1}{k_{end(b)} - k_{start(b)} + 1}\sum_{k=k_{start(b)}}^{k_{end(b)}} X_{\hat{M}}(m,k)^2$$

where $w_b(m)$ is a weighting, $k_{end(b)}$ is an end of a number of sums and $k_{start(b)}$ is a start of the number of sums.

8. The method of any of Embodiments 1-7 wherein storing the decoded parameters as estimated parameters comprises:

filtering the decoded parameters using a low-pass filter;

storing the filtered decoded parameters as the estimated parameters.

9. A decoder (200) for a communication network, the decoder (100) comprising:

a processor (801); and memory (803) coupled with the processor, wherein the memory comprises instructions that when executed by the processor cause the processor to perform operations according to any of Embodiments 1-8.

10. A computer program comprising computer-executable instructions configured to cause a device to perform the method according to any one of Embodiments 1-9, when the computer-executable instructions are executed on a processor (801) comprised in the device.

11. A computer program product comprising a non-transitory computer-readable storage medium (803), the computer-readable storage medium having computer-executable instructions configured to cause a device to perform the method according to any one of Embodiments 1-8 when the computer-executable instructions are executed on a processor (801) comprised in the device.

12. An apparatus configured to substitute decoded parameters with estimated parameters in a received multichannel signal, the apparatus comprising"

at least one processor (801);

memory (803) communicatively coupled to the processor, said memory comprising instructions executable by the processor, which cause the processor to perform operations comprising:

decoding (900) an earlier frame of consecutive frames of the received multichannel signal;

detecting (740, 902) whether a source is an active source;

responsive to determining the source is an active source:

storing (904) decoded parameters of the earlier frame as estimated parameters; and determining (906) a parameter stability measure;

responsive to receiving (908) a previous frame bad frame indicator while operating in a predictive decoding mode with a current frame of the consecutive frames:

determining (910) whether the parameter stability measure is below a threshold; and activating (730, 912) a parameter recovery by retrieving the estimated parameters and replacing decoded parameters of a current frame with the estimated parameters responsive to the parameter stability measure being below the threshold.

13. The apparatus of Embodiment 12, wherein detecting whether the source is an active source comprises:

receiving an indication from one of a voice activity detector or a generic sound activity detector that the current frame represents an active source.

14. The apparatus of Embodiment 12, wherein detecting whether the source is an active source comprises:

deriving (1000) an energy of a reconstructed down-mix signal of a current frame in accordance with $$E_{DMX}(m)=\Sigma_{k=0}^{N-1}X_{\hat{M}}(m,k)^2$$

deriving (1002) a peak energy measure via a filtering step in accordance with $$E_{DMX,PEAK}(m) = \beta E_{DMX}(m) + (1-\beta)E_{DMX,PEAK}(m-1)$$

$$\beta = \begin{cases} \beta_{attack}, & E_{DMX}(m) \geq E_{DMX,PEAK}(m-1) \\ \beta_{decay}, & E_{DMX}(m) < E_{DMX,PEAK}(m-1) \end{cases}; \text{ and}$$

determining (1004) the source is an active source when the energy of the reconstructed down-mix signal of the current frame is larger than the peak energy measure, where $X_{\hat{M}}(m,k)$ is the reconstructed down-mix signal, $E_{DMX}(m)$ is the energy of the reconstructed down-mix signal, $E_{DMX,PEAK}$ is a peak energy, $\beta_{attack}$ is a first filter parameter in a first range between 0.5 and 1.0 and $\beta_{decay}$ is a second filter parameter in a range between 0.01 and 0.3.

15. The apparatus of Embodiment 12, wherein detecting whether the source is an active source comprises:

deriving (1100) an energy of a reconstructed down-mix signal of a current frame in accordance with $$E_{DMX}(m)=\Sigma_{k=0}^{N-1}X_{\hat{M}}(m,k)^2$$

deriving (1102) a noise floor measure via a filtering step in accordance with $$E_{DMX,NF}(m) = \beta E_{DMX}(m) + (1-\beta)E_{DMX,NF}(m-1)$$

$$\beta = \begin{cases} \beta_{attack}, & E_{DMX}(m) < E_{DMX,NF}(m-1) \\ \beta_{decay}, & E_{DMX}(m) \geq E_{DMX,NF}(m-1) \end{cases}; \text{ and}$$

determining (1104) the source is an active source when $E_{DMX}(m)>CE_{DMX,NF}(m-1)$ where $X_{\hat{M}}(m,k)$ is the reconstructed down-mix signal, $E_{DMX}(m)$ is the energy of the reconstructed down-mix signal, $E_{DMX,NF}$ is a noise-floor energy, $\beta_{attack}$ is a first filter parameter, $\beta_{decay}$ is a second filter parameter, and C is a threshold parameter 16. The apparatus of Embodiment 15 wherein $C=10^{6/20}$.

17. The apparatus of any of Embodiments 12-16 further comprising determining the parameter stability measure in accordance with $$D(m) = \frac{1}{N_{bands}} \sum_{b=0}^{N_{bands}-1} (\hat{\alpha}_b(m) - \hat{\alpha}_b(m-1))^2$$

$$D_{LP}(m)=\gamma D(m)+(1-\gamma)D(m-1)$$

where D(m) is a squared Euclidian distance between reconstructed parameter vectors for each frame of the received multichannel signal, $\hat{\alpha}_b(M)$ is a reconstructed prediction parameter, $N_{bands}$ is a total number of frequency bands, $\gamma$ is a filter parameter, and $D_{LP}(m)$ is a low pass filtered D(m).

18. The apparatus of Embodiment 17 further comprising weighting the squared Euclidian distance in accordance with $$D(m) = \frac{1}{N_{bands}} \sum_{b=0}^{N_{bands}-1} (\hat{\alpha}_b(m) - \hat{\alpha}_b(m-1))^2 \cdot w_b(m)$$

$$w_b(m) = \frac{1}{k_{end(b)} - k_{start(b)} + 1} \sum_{k=k_{start(b)}}^{k_{end(b)}} X_{\hat{M}}(m,k)^2$$

where $w_b(m)$ is a weighting, $k_{end(b)}$ is an end of a number of sums and $k_{start(b)}$ is a start of the number of sums.

19. The apparatus of any of Embodiments 12-19 wherein storing the decoded parameters as estimated parameters comprises:

filtering the decoded parameters using a low-pass filter;

storing the filtered decoded parameters as the estimated parameters.

20. A method of replacing decoded parameters with estimated parameters in a received multichannel signal in a decoder device comprising a processor, the method comprising the processor performing operations comprising:

receiving (1200) a current frame of the received multichannel signal;

decoding (404, 1202) parameters of the current frame of the received multichannel signal;

determining (712, 1204) whether the decoder device should operate in a predictive decoding mode or an absolute decoding mode;

responsive to determining that the decoder device should be operating in the predictive coding mode:

responsive to receiving (1206) a previous frame bad frame indicator:

determining (1208) whether a parameter stability measure is below a threshold;

responsive to the parameter stability measure being below the threshold:

setting(718, 1210) the parameter recovery flag to a second value; and retrieving (730, 1220) the estimated parameters and replacing decoded parameters of the current frame with the estimated parameters;

responsive to the parameter stability measure being above the threshold:

detecting (740, 1214) whether the source is an active source;

responsive to determining the source is an active source:

storing (750, 1216) decoded parameters of the current frame as the estimated parameters; and determining (760, 1218) the parameter stability measure;

responsive to not receiving the previous frame bad frame indicator:

responsive (720, 1212) to the parameter recovery flag being set to the first value:

detecting (740, 1214) whether the source is an active source;

responsive to determining the source is an active source:

storing (750, 1216) decoded parameters as estimated parameters; and determining (760, 1218) the parameter stability measure; and responsive to the parameter recovery flag being set to the second value:

retrieving (730, 1220) the estimated parameters and replacing decoded parameters of the current frame with the estimated parameters; and responsive to the decoder device operating in an absolute decoding mode:

setting (716, 1222) a parameter recovery flag to a first value;

detecting (740, 1214) whether a source is an active source;

responsive to determining the source is an active source:

storing (750, 1216) decoded parameters of the earlier frame as estimated parameters; and determining (760, 1218) the parameter stability measure.

21. The method of Embodiment 20, further comprising:

responsive to the source not being an active source:

determining (760, 1218) the parameter stability measure.

22. The method of any of Embodiments 20-21, wherein detecting whether the source is an active source comprises:

receiving an indication from one of a voice active detection detector or a generic sound activity detection detector that a current frame represents an active source.

23. The method of any of Embodiments 20-21, wherein detecting whether the source is an active source comprises:

deriving (1000) an energy of a reconstructed down-mix signal of a current frame in accordance with $$E_{DMX}(m)=\Sigma_{k=0}^{N-1}X_{\hat{M}}(m,k)^2$$

deriving (1002) a peak energy measure via a filtering step in accordance with $$E_{DMX,PEAK}(m)=\beta E_{DMX}(m)+(1-\beta)E_{DMX,PEAK}(m-1)$$

$$\beta=\begin{cases}\beta_{attack}, & E_{DMX}(m)\geq E_{DMX,PEAK}(m-1)\\ \beta_{decay}, & E_{DMX}(m)<E_{DMX,PEAK}(m-1)\end{cases};\text{ and}$$

determining (1004) the source is an active source when the energy of the reconstructed down-mix signal of the current frame is larger than the peak energy measure, where $X_{\hat{M}}(m,k)$ is the reconstructed down-mix signal, $E_{DMX}(m)$ is the energy of the reconstructed down-mix signal, $E_{DMX,PEAK}$ is a peak energy, $\beta_{attack}$ is a first filter parameter in a first range between 0.5 and 1.0 and $\beta_{decay}$ is a second filter parameter in a range between 0.01 and 0.3.

24. The method of any of Embodiments 20-21, wherein detecting whether the source is an active source comprises:

deriving (1100) an energy of a reconstructed down-mix signal of a current frame in accordance with $$E_{DMX}(m)=\Sigma_{k=0}^{N-1}X_{\hat{M}}(m,k)^2$$

deriving (1102) a noise floor energy measure via a filtering step in accordance with $$E_{DMX,NF}(m)=\beta E_{DMX}(m)+(1-\beta)E_{DMX,NF}(m-1)$$

$$\beta=\begin{cases}\beta_{attack}, & E_{DMX}(m)<E_{DMX,NF}(m-1)\\ \beta_{decay}, & E_{DMX}(m)\geq E_{DMX,NF}(m-1)\end{cases};\text{ and}$$

determining (1104) the source is an active source when $E_{DMX}(m)>CE_{DMX,NF}(m-1)$ where $X_{\hat{M}}(m,k)$ is the reconstructed down-mix signal, $E_{DMX}(m)$ is the energy of the reconstructed down-mix signal, $E_{DMX,NF}$ is a noise-floor energy, $\beta_{attack}$ is a first filter parameter, $\beta_{decay}$ is a second filter parameter, and C is a threshold parameter 25. The method of Embodiment 24 wherein $C=10^{6/20}$.

26. The method of any of Embodiments 20-25 further comprising:

responsive to the parameter recovery flag being set to the first value:

determining the parameter stability measure.

27. The method of Embodiment 26 further comprising determining the parameter stability measure in accordance with $$D(m)=\frac{1}{N_{bands}}\sum_{b=0}^{N_{bands}-1}(\hat{\alpha}_b(m)-\hat{\alpha}_b(m-1))^2$$

$$D_{LP}(m)=\gamma D(m)+(1-\gamma)D(m-1)$$

where D(m) is a squared Euclidian distance between reconstructed parameter vectors for each frame of the received multichannel signal, $\hat{\alpha}_b(m)$ is a reconstructed prediction parameter, $N_{bands}$ is a total number of frequency bands, $\gamma$ is a filter parameter, and $D_{LP}(m)$ is a low pass filtered D(m).

28. The method of Embodiment 27 further comprising weighting the squared Euclidian distance in accordance with $$D(m)=\frac{1}{N_{bands}}\sum_{b=0}^{N_{bands}-1}(\hat{\alpha}_b(m)-\hat{\alpha}_b(m-1))^2\cdot w_b(m)$$

$$w_b(m)=\frac{1}{k_{end(b)}-k_{start(b)}+1}\sum_{k-k_{start(b)}}^{k_{end(b)}}X_{\hat{M}}(m,k)^2$$

where $w_b(m)$ is a weighting, $k_{end(b)}$ is an end of a number of sums and $k_{start(b)}$ is a start of the number of sums.

29. The method of any of Embodiments 20-28 wherein storing the decoded parameters as estimated parameters comprises:
filtering the decoded parameters using a low-pass filter;
storing the filtered decoded parameters as the estimated parameters.

30. A decoder (200) for a communication network, the decoder (100) comprising:
a processor (801); and
memory (803) coupled with the processor, wherein the memory comprises instructions that when executed by the processor cause the processor to perform operations according to any of Embodiments 20-29.

31. A computer program comprising computer-executable instructions configured to cause a device to perform the method according to any one of Embodiments 20-28, when the computer-executable instructions are executed on a processor (801) comprised in the device.

32. A computer program product comprising a non-transitory computer-readable storage medium (803), the computer-readable storage medium having computer-executable instructions configured to cause a device to perform the method according to any one of Embodiments 20-28 when the computer-executable instructions are executed on a processor (801) comprised in the device.

33. An apparatus configured to replace decoded parameters with estimated parameters in a received multichannel signal, the apparatus comprising:
at least one processor (801);
memory (803) communicatively coupled to the processor, said memory comprising instructions executable by the processor, which cause the processor to perform operations comprising:
receiving (1200) a current frame of the received multichannel signal;
decoding (404, 1202) parameters of the current frame of the received multichannel signal;
determining (712, 1204) whether the decoder device should operate in a predictive decoding mode or an absolute decoding mode;
responsive to determining that the decoder device should be operating in the predictive coding mode:
responsive to receiving (1206) a previous frame bad frame indicator:
determining (1208) whether a parameter stability measure is below a threshold;
responsive to the parameter stability measure being below the threshold:
setting(718, 1210) the parameter recovery flag to a second value; and
retrieving (730, 1220) the estimated parameters and replacing decoded parameters of the current frame with the estimated parameters;
responsive to the parameter stability measure being above the threshold:
detecting (740, 1214) whether the source is an active source;
responsive to determining the source is an active source:
storing (750, 1216) decoded parameters of the current frame as the estimated parameters; and
determining (760, 1218) the parameter stability measure;
responsive to not receiving the previous frame bad frame indicator:
responsive (720, 1212) to the parameter recovery flag being set to the first value:
detecting (740, 1214) whether the source is an active source;
responsive to determining the source is an active source:
storing (750, 1216) decoded parameters as estimated parameters; and
determining (760, 1218) the parameter stability measure; and
responsive to the parameter recovery flag being set to the second value:
retrieving (730, 1220) the estimated parameters and replacing decoded parameters of the current frame with the estimated parameters; and
responsive to the decoder device operating in an absolute decoding mode:
setting (716, 1222) a parameter recovery flag to a first value;
detecting (740, 1214) whether a source is an active source;
responsive to determining the source is an active source:
storing (750, 1216) decoded parameters of the earlier frame as estimated parameters; and
determining (760, 1218) the parameter stability measure.

34. The apparatus of Embodiment 33 wherein the instructions contain further instructions executable by the processor, which cause the processor to perform operations comprising:
responsive to the source not being an active source:
determining (760, 1218) the parameter stability measure.

35. The apparatus of any of Embodiments 33-34, wherein detecting whether the source is an active source comprises:
receiving an indication from one of a voice active detection detector or a generic sound activity detection detector that a current frame represents an active source.

36. The apparatus of any of Embodiments 33-34, wherein detecting whether the source is an active source comprises:
deriving (1000) an energy of a reconstructed down-mix signal of a current frame in accordance with $$E_{DMX}(m)=\Sum_{k=0}^{N-1}X_{\hat{M}}(m,k)^2$$

deriving (1002) a peak energy measure via a filtering step in accordance with $$E_{DMX,PEAK}(m) = \beta E_{DMX}(m) + (1-\beta)E_{DMX,PEAK}(m-1)$$

$$\beta = \begin{cases} \beta_{attack}, & E_{DMX}(m) \geq E_{DMX,PEAK}(m-1) \\ \beta_{decay}, & E_{DMX}(m) < E_{DMX,PEAK}(m-1) \end{cases}; \text{ and}$$

determining (1004) the source is an active source when the energy of the reconstructed down-mix signal of the current frame is larger than the peak energy measure,
where $X_{\hat{M}}(m,k)$ is the reconstructed down-mix signal, $E_{DMX}(m)$ is the energy of the reconstructed down-mix signal, $E_{DMX,PEAK}$ is a peak energy, $\beta_{attack}$ is a first filter parameter in a first range between 0.5 and 1.0 and $\beta_{decay}$ is a second filter parameter in a range between 0.01 and 0.3.

37. The apparatus of any of Embodiments 33-34, wherein detecting whether the source is an active source comprises:

deriving (1100) an energy of a reconstructed down-mix signal of a current frame in accordance with $$E_{DMX}(m)=\Sigma_{k=0}^{N-1}X_{\hat{M}}(m,k)^2$$

deriving (1102) a noise floor energy measure via a filtering step in accordance with $$E_{DMX,NF}(m) = \beta E_{DMX}(m) + (1-\beta)E_{DMX,NF}(m-1)$$

$$\beta = \begin{cases} \beta_{attack}, & E_{DMX}(m) < E_{DMX,NF}(m-1) \\ \beta_{decay}, & E_{DMX}(m) \geq E_{DMX,NF}(m-1) \end{cases}; \text{ and}$$

determining (1104) the source is an active source when $E_{DMX}(m)>CE_{DMX,NF}(m-1)$ where $X_{\hat{M}}(m,k)$ is the reconstructed down-mix signal, $E_{DMX}(m)$ is the energy of the reconstructed down-mix signal, $E_{DMX,NF}$ is a noise-floor energy, $\beta_{attack}$ is a first filter parameter, $\beta_{decay}$ is a second filter parameter, and C is a threshold parameter 38. The apparatus of Embodiment 37 wherein $C=10^{6/20}$.

39. The apparatus of any of Embodiments 33-38 further comprising:

responsive to the parameter recovery flag being set to the first value:

determining the parameter stability measure.

40. The apparatus of Embodiments 39 further comprising determining the parameter stability measure in accordance with $$D(m) = \frac{1}{N_{bands}}\sum_{b=0}^{N_{bands}-1}(\hat{\alpha}_b(m) - \hat{\alpha}_b(m-1))^2$$

$$D_{LP}(m) = \gamma D(m) + (1-\gamma)D(m-1)$$

where D(m) is a squared Euclidian distance between reconstructed parameter vectors for each frame of the received multichannel signal, $\hat{\alpha}_b(m)$ is a reconstructed prediction parameter, $N_{bands}$ is a total number of frequency bands, $\gamma$ is a filter parameter, and $D_{LP}(m)$ is a low pass filtered D(m).

41. The apparatus of Embodiment 40 further comprising weighting the squared Euclidian distance in accordance with $$D(m) = \frac{1}{N_{bands}}\sum_{b=0}^{N_{bands}-1}(\hat{\alpha}_b(m) - \hat{\alpha}_b(m-1))^2 \cdot w_b(m)$$

$$w_b(m) = \frac{1}{k_{end(b)} - k_{start(b)} + 1}\sum_{k-k_{start(b)}}^{k_{end(b)}} X_{\hat{M}}(m,k)^2$$

where $w_b(m)$ is a weighting, $k_{end(b)}$ is an end of a number of sums and $k_{start(b)}$ is a start of the number of sums.

42. The apparatus of any of Embodiments 33-41 wherein storing the decoded parameters as estimated parameters comprises:

filtering the decoded parameters using a low-pass filter;

storing the filtered decoded parameters as the estimated parameters.

43. A method of replacing decoded parameters in a received multichannel signal in a decoder device comprising a processor, the method comprising the processor performing operations comprising:

receiving decoded parameters of a current frame of received multichannel signal;

determining (720, 1212) that a parameter recovery flag is set to a first value of the parameter recovery flag;

determining (1400) whether a memory corrupt flag is set to a first value of the memory corrupt flag;

responsive to the memory corrupt flag is set to the first value of the memory corrupt flag, determining (740, 1214) whether the source is an active source;

responsive to determining the source is an active source:

storing (750, 1216) decoded parameters as estimated parameters; and determining (760, 1218) the parameter stability measure.

44. An apparatus configured to replace decoded parameters with estimated parameters in a received multichannel signal, the apparatus comprising:

at least one processor (801);

memory (803) communicatively coupled to the processor, said memory comprising instructions executable by the processor, which cause the processor to perform operations comprising:

receiving decoded parameters of a current frame of received multichannel signal;

determining (720, 1212) that a parameter recovery flag is set to a first value of the parameter recovery flag;

determining (1400) whether a memory corrupt flag is set to a first value of the memory corrupt flag;

responsive to the memory corrupt flag is set to the first value of the memory corrupt flag, determining (740, 1214) whether the source is an active source;

responsive to determining the source is an active source:

storing (750, 1216) decoded parameters as estimated parameters; and determining (760, 1218) the parameter stability measure.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The invention claimed is:

1. A method of replacing decoded parameters in a received multichannel signal in a decoder, the method comprising:
- decoding a current frame of consecutive frames of the received multichannel signal;
- responsive to receiving a previous frame bad frame indicator while operating in a predictive decoding mode with the current frame of the consecutive frames:
  - determining whether a parameter stability measure for a last observed active source is below a threshold; and activating a parameter recovery by retrieving estimated parameters, wherein the estimated parameters are decoded parameters of an earlier frame of consecutive frames of the received multichannel signal, and replacing decoded parameters of the current frame with the estimated parameters responsive to the parameter stability measure being below the threshold, and responsive to the parameter stability measure not being below the threshold, detecting whether the current frame represents an active source:

responsive to determining that the current frame represents an active source:

storing decoded parameters of the current frame as estimated parameters; and determining the parameter stability measure.

2. The method of claim 1 further comprising:

receiving an indication from one of a voice activity detector or a generic sound activity detector that the current frame represents an active source.

3. The method of claim 1 further comprising:

deriving an energy of a reconstructed down-mix signal of the current frame in accordance with $$E_{DMX}(m)=\Sigma_{k=0}^{N-1}X_{\hat{M}}(m,k)^2$$

deriving a peak energy measure via a filtering step in accordance with $$E_{DMX,PEAK}(m) = \beta E_{DMX}(m) + (1-\beta)E_{DMX,PEAK}(m-1)$$

$$\beta = \begin{cases} \beta_{attack}, & E_{DMX}(m) \geq E_{DMX,PEAK}(m-1) \\ \beta_{decay}, & E_{DMX}(m) < E_{DMX,PEAK}(m-1) \end{cases}; \text{ and}$$

determining the current frame represents an active source when the energy of the reconstructed down-mix signal of the current frame is larger than the peak energy measure, where $X_{\hat{M}}(m,k)$ is the reconstructed down-mix signal, $E_{DMX}(m)$ is the energy of the reconstructed down-mix signal, $E_{DMX,PEAK}$ is a peak energy, $\beta_{attack}$ is a first filter parameter in a first range between 0.5 and 1.0 and $\beta_{decay}$ is a second filter parameter in a range between 0.01 and 0.3.

4. The method of claim 1 further comprising:

deriving an energy of a reconstructed down-mix signal of the current frame in accordance with $$E_{DMX}(m)=\Sigma_{k=0}^{N-}X_{\hat{M}}(m,k)^2$$

deriving a noise floor energy measure via a filtering step in accordance with $$E_{DMX,NF}(m) = \beta E_{DMX}(m) + (1-\beta)E_{DMX,NF}(m-1)$$

$$\beta = \begin{cases} \beta_{attack}, & E_{DMX}(m) < E_{DMX,NF}(m-1) \\ \beta_{decay}, & E_{DMX}(m) \geq E_{DMX,NF}(m-1) \end{cases}; \text{ and}$$

determining the current frame represents an active source when $$E_{DMX}(m)>CE_{DMX,NF}(m-1)$$

where $X_{\hat{M}}(m,k)$ is the reconstructed down-mix signal, $E_{DMX}(m)$ is the energy of the reconstructed down-mix signal, $E_{DMX,NF}$ is a noise-floor energy, $\beta_{attack}$ is a first filter parameter, $\beta_{decay}$ is a second filter parameter, and C is a threshold parameter.

5. The method of claim 4 wherein $C=10^{6/20}$.

6. The method of claim 1 further comprising determining the parameter stability measure in accordance with $$D(m) = \frac{1}{N_{bands}}\sum_{b=0}^{N_{bands}-1}(\hat{\alpha}_b(m) - \hat{\alpha}_b(m-1))^2$$

$$D_{LP}(m) = \gamma D(m) + (1-\gamma)D(m-1)$$

where D(m) is a squared Euclidian distance between reconstructed parameter vectors for each frame of the received multichannel signal, $\hat{\alpha}_b(m)$ is a reconstructed prediction parameter, $N_{bands}$ is a total number of frequency bands, γ is a filter parameter, and $D_{LP}(m)$ is a low pass filtered D (m).

7. The method of claim 6 further comprising weighting the squared Euclidian distance in accordance with $$D(m) = \frac{1}{N_{bands}}\sum_{b=0}^{N_{bands}-1}(\hat{\alpha}_b(m) - \hat{\alpha}_b(m-1))^2 \cdot w_b(m)$$

$$w_b(m) = \frac{1}{k_{end(b)} - k_{start(b)} + 1}\sum_{k-k_{start(b)}}^{k_{end(b)}} X_{\hat{M}}(m,k)^2$$

where $w_b(m)$ is a weighting, $k_{end(b)}$ is an end of a number of sums and $k_{start(b)}$ is a start of the number of sums.

8. The method of claim 1 wherein storing the decoded parameters as estimated parameters comprises:

filtering the decoded parameters using a low-pass filter;

storing the filtered decoded parameters as the estimated parameters.

9. An apparatus configured to replace decoded parameters with estimated parameters in a received multichannel signal, the apparatus comprising:

at least one processor;

memory communicatively coupled to the processor, said memory comprising instructions executable by the processor, which cause the processor to perform operations comprising:

decoding a frame of consecutive frames of the received multichannel signal;

responsive to receiving a previous frame bad frame indicator while operating in a predictive decoding mode with a current frame of the consecutive frames:

determining whether a parameter stability measure for a last observed active source is below a threshold; and activating a parameter recovery by retrieving estimated parameters, wherein the estimated parameters are decoded parameters of an earlier frame of consecutive frames of the received multichannel signal, and replacing decoded parameters of a current frame with the estimated parameters responsive to the parameter stability measure being below the threshold, and responsive to the parameter stability measure not being below the threshold, detecting whether the current frame represents an active source:

responsive to determining that the current frame represents an active source:

storing decoded parameters of the current frame as estimated parameters; and determining the parameter stability measure.

10. The apparatus of claim 9, wherein the operations further include:

receiving an indication from one of a voice activity detector or a generic sound activity detector that the current frame represents an active source.

11. The apparatus of claim 9, wherein the operations further include:

deriving an energy of a reconstructed down-mix signal of a current frame in accordance with $$E_{DMX}(m)=\sum_{k=0}^{N-1}X_{\hat{M}}(m,k)^2$$

deriving a peak energy measure via a filtering step in accordance with $$E_{DMX,PEAK}(m)=\beta E_{DMX}(m)+(1-\beta)E_{DMX,PEAK}(m-1)$$

$$\beta=\begin{cases}\beta_{attack}, & E_{DMX}(m)\geq E_{DMX,PEAK}(m-1)\\ \beta_{decay}, & E_{DMX}(m)<E_{DMX,PEAK}(m-1)\end{cases};\text{ and}$$

determining the current frame represents an active source when the energy of the reconstructed down-mix signal of the current frame is larger than the peak energy measure, where $X_{\hat{M}}(m,k)$ is the reconstructed down-mix signal, $E_{DMX}(m)$ is the energy of the reconstructed down-mix signal, $E_{DMX,PEAK}$ is a peak energy, $\beta_{attack}$ is a first filter parameter in a first range between 0.5 and 1.0 and $\beta_{decay}$ is a second filter parameter in a range between 0.01 and 0.3.

12. The apparatus of claim 9, wherein the operations further include:

deriving an energy of a reconstructed down-mix signal of a current frame in accordance with $$E_{DMX}(m)=\sum_{k=0}^{N-1}X_{\hat{M}}(m,k)^2$$

deriving a noise floor measure via a filtering step in accordance with $$E_{DMX,NF}(m)=\beta E_{DMX}(m)+(1-\beta)E_{DMX,NF}(m-1)$$

$$\beta=\begin{cases}\beta_{attack}, & E_{DMX}(m)<E_{DMX,NF}(m-1)\\ \beta_{decay}, & E_{DMX}(m)\geq E_{DMX,NF}(m-1)\end{cases};\text{ and}$$

determining the current frame represents an active source when $$E_{DMX}(m)>CE_{DMX,NF}(m-1)$$

where $X_{\hat{M}}(m,k)$ is the reconstructed down-mix signal, $E_{DMX}(m)$ is the energy of the reconstructed down-mix signal, $E_{DMX,NF}$ is a noise-floor energy, $\beta_{attack}$ is a first filter parameter, $\beta_{decay}$ is a second filter parameter, and C is a threshold parameter.

13. The apparatus of claim 12 wherein $C=10^{6/20}$.

14. The apparatus of claim 9 further comprising determining the parameter stability measure in accordance with $$D(m)=\frac{1}{N_{bands}}\sum_{b=0}^{N_{bands}-1}(\hat{\alpha}_b(m)-\hat{\alpha}_b(m-1))^2$$

$$D_{LP}(m)=\gamma D(m)+(1-\gamma)D(m-1)$$

where D(m) is a squared Euclidian distance between reconstructed parameter vectors for each frame of the received multichannel signal, $\hat{\alpha}_b(m)$ is a reconstructed prediction parameter, $N_{bands}$ is a total number of frequency bands, $\gamma$ is a filter parameter, and $D_{LP}(m)$ is a low pass filtered D(m).

15. The apparatus of claim 14 further comprising weighting the squared Euclidian distance in accordance with $$D(m)=\frac{1}{N_{bands}}\sum_{b=0}^{N_{bands}-1}(\hat{\alpha}_b(m)-\hat{\alpha}_b(m-1))^2\cdot w_b(m)$$

$$w_b(m)=\frac{1}{k_{end(b)}-k_{start(b)}+1}\sum_{k-k_{start(b)}}^{k_{end(b)}}X_{\hat{M}}(m,k)^2$$

where $w_b(m)$ is a weighting, $k_{end(b)}$ is an end of a number of sums and $k_{start(b)}$ is a start of the number of sums.

16. The apparatus of claim 9 wherein storing the decoded parameters as estimated parameters comprises:

filtering the decoded parameters using a low-pass filter;

storing the filtered decoded parameters as the estimated parameters.

17. The apparatus of claim 9 wherein the apparatus comprises a decoder for a communication network.

18. A method of replacing decoded parameters with estimated parameters in a received multichannel signal in a decoder, the method comprising:

receiving a current frame of the received multichannel signal;

decoding parameters of the current frame of the received multichannel signal;

determining whether the decoder should operate in a predictive decoding mode or an absolute decoding mode;

responsive to determining that the decoder should be operating in the predictive coding mode:

responsive to receiving a previous frame bad frame indicator:

determining whether a parameter stability measure for a last observed active source is below a threshold;

responsive to the parameter stability measure being below the threshold:

setting a parameter recovery flag to a second value; and retrieving the estimated parameters and replacing decoded parameters of the current frame with the estimated parameters;

responsive to the parameter stability measure being above the threshold:

responsive to a current frame representing an active source:

storing decoded parameters of the current frame as the estimated parameters; and determining the parameter stability measure;

responsive to not receiving the previous frame bad frame indicator:

responsive to the parameter recovery flag being set to a first value:

responsive to the current frame representing an active source:

storing decoded parameters as estimated parameters; and determining the parameter stability measure; and responsive to the parameter recovery flag being set to the second value:

retrieving the estimated parameters and replacing decoded parameters of the current frame with the estimated parameters; and responsive to the decoder operating in an absolute decoding mode:

setting a parameter recovery flag to a first value;

responsive to the current frame representing an active source:

storing decoded parameters as estimated parameters; and determining the parameter stability measure.

19. The method of claim 18, further comprising:

responsive to the current frame not representing an active source:

determining the parameter stability measure.

20. The method of claim 18, further comprising detecting whether the current frame represents an active source by receiving an indication from one of a voice active detection detector or a generic sound activity detection detector that the current frame represents an active source.

21. The method of claim 18 further comprising:

responsive to the parameter recovery flag being set to the first value:

determining the parameter stability measure.

22. The method of claim 18 wherein storing the decoded parameters as estimated parameters comprises:

filtering the decoded parameters using a low-pass filter;

storing the filtered decoded parameters as the estimated parameters.

23. An apparatus configured to replace decoded parameters with estimated parameters in a received multichannel signal, the apparatus comprising:

at least one processor;

memory communicatively coupled to the processor, said memory comprising instructions executable by the processor, which cause the processor to perform operations comprising:

receiving a current frame of the received multichannel signal;

decoding parameters of the current frame of the received multichannel signal;

determining whether the decoder should operate in a predictive decoding mode or an absolute decoding mode;

responsive to determining that the decoder should be operating in the predictive coding mode:

responsive to receiving a previous frame bad frame indicator:

determining whether a parameter stability measure for a last observed active source is below a threshold;

responsive to the parameter stability measure being below the threshold:

setting a parameter recovery flag to a second value; and retrieving the estimated parameters and replacing decoded parameters of the current frame with the estimated parameters;

responsive to the parameter stability measure being above the threshold:

detecting whether a current frame represents an active source;

responsive to determining the current frame represents an active source:

storing decoded parameters of the current frame as the estimated parameters; and determining the parameter stability measure;

responsive to not receiving the previous frame bad frame indicator:

responsive to the parameter recovery flag being set to a first value:

detecting whether the current frame represents an active source;

responsive to determining the current frame represents an active source:

storing decoded parameters as estimated parameters; and determining the parameter stability measure; and responsive to the parameter recovery flag being set to the second value:

retrieving the estimated parameters and replacing decoded parameters of the current frame with the estimated parameters; and responsive to the decoder operating in an absolute decoding mode:

setting a parameter recovery flag to the first value;

detecting whether the current frame represents an active source;

responsive to determining the current frame represents an active source:

storing decoded parameters as estimated parameters; and determining the parameter stability measure.

24. The apparatus of claim 23 wherein the instructions contain further instructions executable by the processor, which cause the processor to perform operations comprising:

responsive to the current frame not representing an active source:

determining the parameter stability measure.

25. The apparatus of claim 23 further comprising:

responsive to the parameter recovery flag being set to the first value:

determining the parameter stability measure.

26. The apparatus of claim 23 wherein the apparatus comprises a decoder for a communication network.

* * * * *